(12) United States Patent
Zwart et al.

(10) Patent No.: US 8,730,268 B2
(45) Date of Patent: May 20, 2014

(54) IMAGE PROCESSING SYSTEMS AND METHODS

(75) Inventors: Christine M. Zwart, Mesa, AZ (US); David H. Frakes, Scottsdale, AZ (US)

(73) Assignee: Arizona Board of Regents, a body corporate of the State of Arizona, Acting for and on behalf of Arizona State University, Scottsdale, AZ (US)

( * ) Notice: Subject to any disclaimer, the term of this patent is extended or adjusted under 35 U.S.C. 154(b) by 709 days.

(21) Appl. No.: 13/021,572

(22) Filed: Feb. 4, 2011

(65) Prior Publication Data

US 2011/0193864 A1    Aug. 11, 2011

Related U.S. Application Data

(60) Provisional application No. 61/301,730, filed on Feb. 5, 2010.

(51) Int. Cl.
G09G 5/00    (2006.01)

(52) U.S. Cl.
USPC ........... 345/671; 345/418; 345/428; 345/581; 382/276; 382/277; 382/278

(58) Field of Classification Search
USPC .......... 345/418, 428, 581, 671; 382/277, 276, 382/278
See application file for complete search history.

(56) References Cited

U.S. PATENT DOCUMENTS

| | | | | |
|---|---|---|---|---|
| 6,163,339 A | * | 12/2000 | Meunier | 348/218.1 |
| 7,831,088 B2 | | 11/2010 | Frakes et al. | |
| 2003/0151625 A1 | * | 8/2003 | Shoemaker | 345/767 |
| 2008/0107356 A1 | * | 5/2008 | Matsumoto et al. | 382/299 |
| 2008/0199081 A1 | * | 8/2008 | Kimura et al. | 382/190 |
| 2010/0165204 A1 | | 7/2010 | Huang et al. | |

OTHER PUBLICATIONS

V. Algazi, G. Ford, and R. Potharlanka, "Directional Interpolation of Images Based on Visual Properties and Rank Order Filtering," in Acoustics, Speech, and Signal Processing. 1991. ICASSP-91., 1991 International Conference on, Apr. 1991, pp. 3005-3008 vol. 4.

H. A. Aly and E. Dubois, "Image Up-Campling Using Total-Variation Regularization With a new Observation Model," IEEE Transactions on Image Processing, vol. 14, No. 10, pp. 1647-1659, 2005.

C. B. Atkins, C. A. Bouman, and J. P. Allebach, "Optimal Image Scaling Using Pixel Classification," in Proc. Int Image Processing Conf, vol. 3, 2001, pp. 864-867.

(Continued)

*Primary Examiner* — Ke Xiao
*Assistant Examiner* — Kim-Thanh T Tran
(74) *Attorney, Agent, or Firm* — Bryan Cave LLP

(57) ABSTRACT

A system for generating an output image based on an original image via an imaging application can comprise a parsing module, an optical flow displacement module, and a new pixel generation module. The parsing module can establish a magnified resolution lattice from an original resolution lattice of the original image. The optical flow displacement module can establish optical displacement vectors extending, within the magnified resolution lattice, between original pixels and optical displacement locations, the optical displacement vectors based on one-dimensional optical flow brightness constraint calculations for the original pixels. The new pixel generation module can generate new pixels in the magnified resolution lattice via one or more interpolations based on the optical displacement vectors. Other embodiments and related methods are also disclosed herein.

26 Claims, 15 Drawing Sheets

(56) References Cited

OTHER PUBLICATIONS

K. S. Ni and T. Q. Nguyen, "An Adoptable K-Nearest Neighbors Algorithm for MMSE Image Interpolation," IEEE Transactions on Image Processing, vol. 18, No. 9, pp. 1976-1987, 2009.

G. P. Penney, J. A. Schnabel, D. Rueckert, M. A. Viergever, and W. J. Niessen, "Registration-Based Interpolation," IEEE Transactions on Medical Imaging, vol. 23, No. 7, pp. 922-926, Jul. 2004.

P. Thevenaz, T. Blu, and M. Unser, "Image Interpolation and Resampling," Handbook of Medical Imaging, Chapter 25, I. N. Bankman, Ed., Orlando, FL, USA: Academic Press, Inc., 2000.

T. M. Lehmann, C. Gonner, and K. Spitzer, "Survey: Interpolation Methods in Medical Image Processing," IEEE Transactions on Medical Imaging, vol. 18, No. 11, pp. 1049-1075, Nov. 1999.

B. Zitova and J. Flusser, "Image Registration Methods: A Survey," Image and Vision Computing, vol. 21, pp. 977-1000, 2003.

D. H. Frakes, L. P. Dasi, K. Pekkan, H. D. Kitajima, K. Sundareswaran, A. P. Yoganathan, and M. J. T. Smith, "A New Method for Registration-Based Medical Image Interpolation," IEEE Transactions on Medical Imaging, vol. 27, No. 3, pp. 370-377, Mar. 2008.

J. Allebach and P. W. Wong, "Edge-Directed Interpolation," in Proc. Conf. Int. Image Processing, vol. 3, pp. 707-710, 1996.

J.-W. Han, J.-H. Kim, S.-H. Cheon, J.-O Kim, and S.-J. Ko, "A Novel Image Interpolation Method Using the Bilateral Filter," IEEE Transactions on Consumer Electronics, vol. 56, No. 1, pp. 175-181, Feb. 2010.

X. Li and M. T. Orchard, "New Edge-Directed Interpolation," IEEE Transactions on Image Processing, vol. 10, No. 10, pp. 1521-1527, Oct. 2001.

N. Asuni and A. Giachetti, "Accuracy Improvements and Artifacts Removal in Edge Based Image Interpolation," Proc. 3rd Int. Conf. Computer Vision Theory and Applications, 2008.

B. S. Morse and D. Schwartzwald, "Image Magnification Using Level-Set Reconstruction," Proc. IEEE Computer Society Conf. Computer Vision and Pattern Recognition CVPR 2001, vol. 1, 2001.

Q. Wang and R. K. Ward, "A New Orientation-Adaptive Interpolation Method," IEEE Transactions on Image Processing, vol. 16, No. 4, pp. 889-900, Apr. 2007.

H. Shi and R. Ward, "Canny Edge Based Image Expansion," in Circuits and Systems, 2002. ISCAS 2002. IEEE International Symposium on, vol. 1, 2002, pp. I-785-I-788 vol. 1.

K. Jensen and D. Anastassiou, "Subpixel Edge Localization and the Interpolation of Still Images," IEEE Transactions on Image Processing, vol. 4, No. 3, pp. 285-295, Mar. 1995.

Q. Wang, R. Ward, and H. Shi, "Isophote Estimation by Cubic-Spline Interpolation," in Image Processing. 2002. Proceedings. 2002 International Conference on, vol. 3, 2002, pp. III-401-III-404 vol. 3.

D. Hill, P. Batchelor, M. Holden, and D. Hawkes, "Medical Image Registration," Physics in Medicine and Biology, vol. 46, pp. R1-R45, 2001.

D. Frakes, K. Pekkan, L. Dasi, H. Kitajima, D. de Zelicourt, H. Leo, J. Carberry, K. Sundareswaran, H. Simon, and A. Yoganathan, "Modified Control Grid Interpolation for the Volumetric Reconstruction of Fluid Flows," Experiments in Fluids, vol. 45, pp. 987-997, 2008.

F. N. Fritsch and R. E. Carlson, "Monotone Piecewise Cubic Interpolation," SIAM Journal on Numerical Analysis, vol. 17, No. 2, pp. pp. 238-246, 1980.

D. H. Frakes, C. P. Conrad, T. M. Healy, J. W. Monaco, M. Fogel, S. Sharma, M. J. T. Smith, Fellow, IEEE, and A. P. Yoganathan, "Application of an Adaptive Control Grid Interpolation Technique to Morphological Vascular Reconstruction," IEEE Transactions on Biomedical Engineering, vol. 50, No. 2, pp. 197-206, Feb. 2003.

X. Ma, S. M. LaConte, Y. M. Kadah, D. H. Frakes, A. P. Yoganathan, X. Hu, "Adaptive Control Grid Interpolation of DTI Data," Biomedical Engineering, Emory University/Georgia Tech, Atlanta, Georgia, United States, 4-D Imaging, Inc., Atlanta, Georgia, United States, Proc. Intl. Soc. Mag. Reson. Med. 11, p. 1214, 2004.

G. Grevera, "An Objective Comparison of 3-D Image Interpolation Methods," IEEE Transactions on Medical Imaging, vol. 17, No. 4, pp. 642-652, Aug. 1998.

\* cited by examiner

Scene-Based      Object-Based
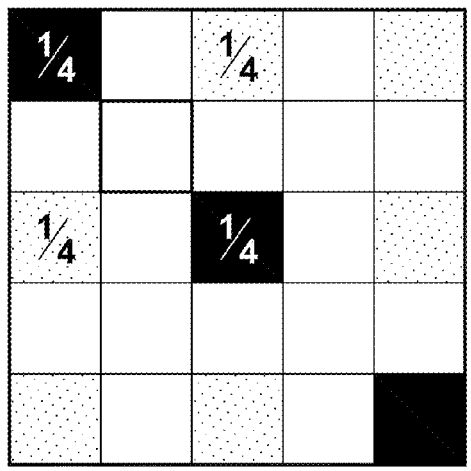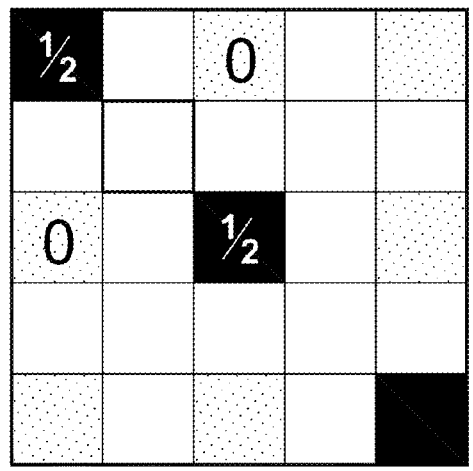
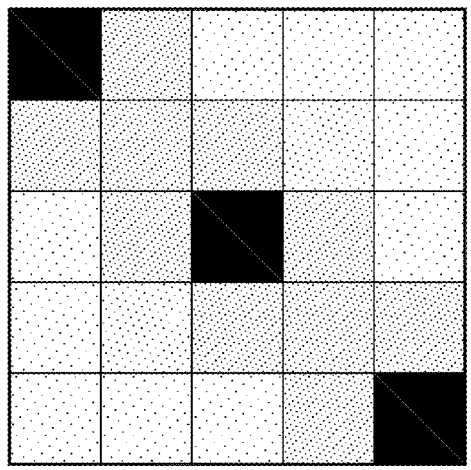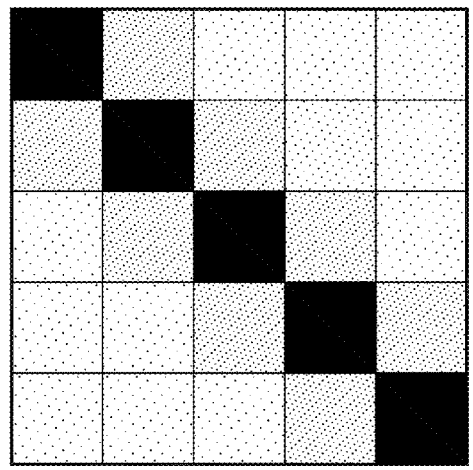
*FIG. 1*

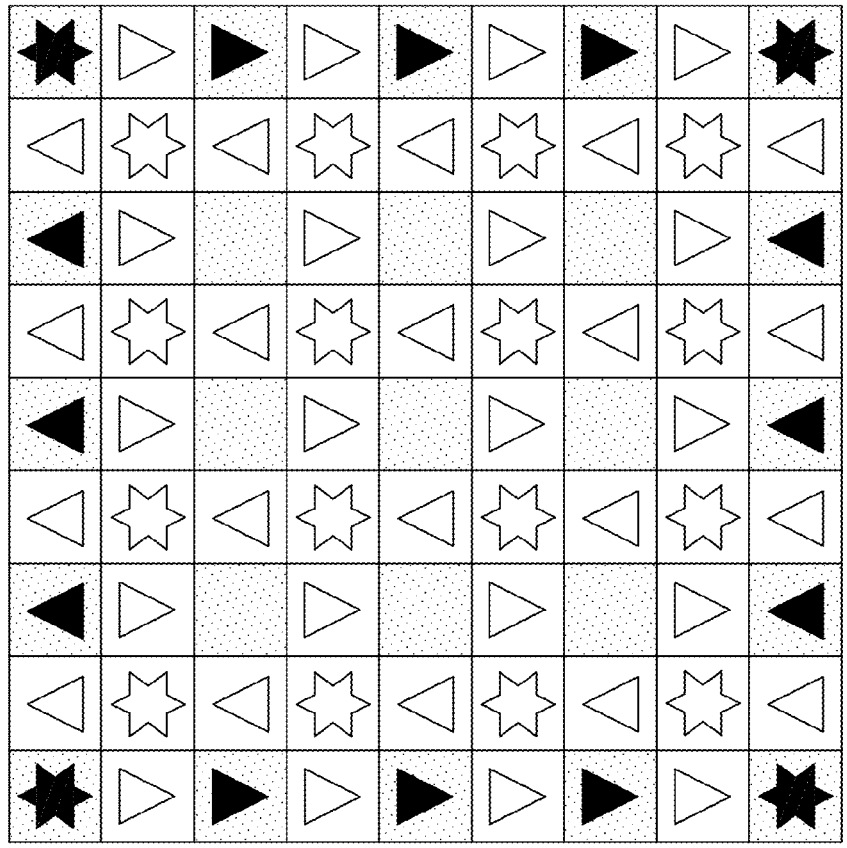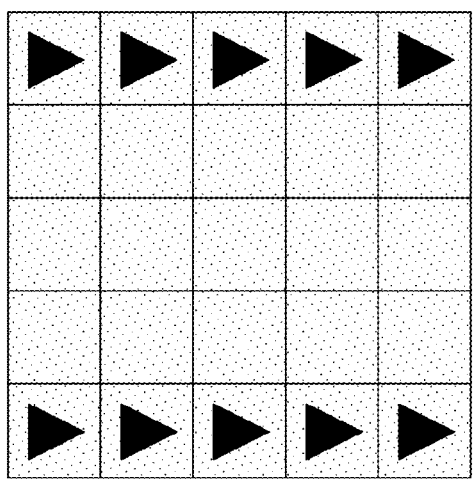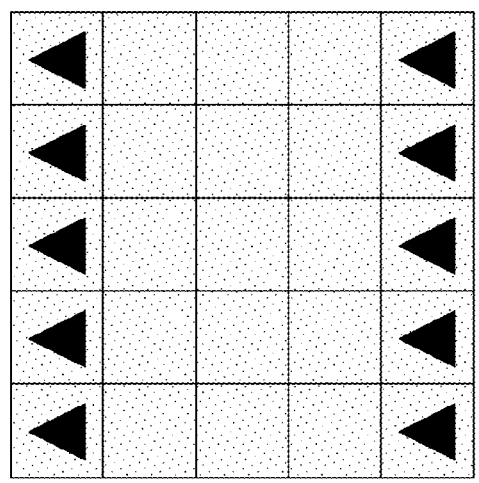
FIG. 5

|  |  | Bilinear | Bicubic | NEDI | iNEDI | 1DCGI | r |
|---|---|---|---|---|---|---|---|
|  | 2x | 33.502 | 34.050 | 33.746 | 33.993 | 34.323 | 6.07% |
|  | 3x | 30.015 | 30.266 | ---- | ---- | 30.748 | 10.52% |
| Lena | 4x | 27.969 | 28.063 | 28.093 | 28.109 | 28.624 | 11.18% |
|  | 2x | 31.305 | 31.983 | 31.818 | 33.022 | 32.502 | -11.28% |
|  | 3x | 27.399 | 27.688 | ---- | ---- | 28.156 | 10.21% |
| Monarch | 4x | 25.172 | 25.353 | 25.305 | 25.614 | 25.617 | 0.07% |
| 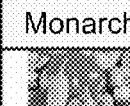 | 2x | 32.691 | 32.826 | 32.751 | 33.210 | 33.242 | 0.72% |
|  | 3x | 30.032 | 30.149 | ---- | ---- | 30.706 | 12.04% |
| Peppers | 4x | 28.291 | 28.357 | 27.717 | 28.719 | 28.935 | 4.84% |
| 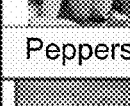 | 2x | 31.881 | 32.175 | 29.353 | 31.454 | 32.359 | 4.15% |
|  | 3x | 28.265 | 28.485 | ---- | ---- | 28.675 | 4.28% |
| Boats | 4x | 26.380 | 26.437 | 25.127 | 26.088 | 26.692 | 5.70% |
| 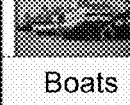 | 2x | 31.694 | 31.646 | 30.585 | 30.983 | 31.818 | 2.81% |
|  | 3x | 28.926 | 28.811 | ---- | ---- | 29.030 | 2.37% |
| Goldhill | 4x | 27.437 | 27.263 | 26.008 | 26.347 | 27.506 | 1.58% |
| 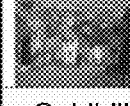 | 2x | 23.133 | 23.122 | 22.718 | 22.789 | 23.323 | 4.29% |
|  | 3x | 19.958 | 19.700 | ---- | ---- | 19.988 | 0.68% |
| Houses | 4x | 18.502 | 18.211 | 18.040 | 17.820 | 18.512 | 0.24% |
|  | 2x | 35.911 | 37.844 | 35.414 | 36.333 | 37.194 | -13.91% |
|  | 3x | 30.879 | 31.813 | ---- | ---- | 31.914 | 2.30% |
| Pens | 4x | 28.291 | 28.578 | 27.812 | 28.342 | 28.995 | 9.17% |
FIG. 12

IMAGE PROCESSING SYSTEMS AND METHODS

CROSS-REFERENCE TO RELATED APPLICATION

This patent application claims priority to U.S. provisional patent application No. 61/301,730, filed on Feb. 5, 2010. The disclosure of the referenced application is incorporated herein by reference.

FIELD OF THE INVENTION

This invention relates generally to image processing systems and methods. and relates, more particularly, to image processing systems and methods based on one-dimensional optical flow interpolations.

BACKGROUND

The importance of edge fidelity in two-dimensional (2D) image interpolation is well established, especially in fields like medical imaging, where clarity is of utmost importance to allow for reliable diagnoses and proper courses of action. Isophotes, or connected pixels of equal intensity, are essential to human perception of static images. Interpolation methods that disrupt isophote curvatures produce distracting artifacts. Classical interpolation methods determine new data based on the immediate neighborhood, and thus assumes that pixels are spatially related to each other, without considering how pixels relate structurally to each other.

Accordingly, a need exists for imaging methods and systems that process images based on structural relationships between pixels for better fidelity, for example, when magnifying images, rather than prior methods that blindly assume that pixels being processed share relevant spatial relationships between each other.

The methods and systems presented herein, based on optical flow vectors within the same image for local ispohote trajectories, and one-dimensional interpolation along such vectors, serves to identify relevant structural relationship between the pixels being processed to generate better results in terms of, for example, peak signal to noise ratio (PSNR), than other interpolation methods such as new edge-directed interpolation (NEDI) and improved NEDI (iNEDI).

BRIEF DESCRIPTION OF THE DRAWINGS

To facilitate further description of the embodiments, the following drawings are provided in which:

FIG. 1 presents an illustration highlighting the differences between scene-based and object-based interpolators.

FIG. 5 illustrates diagrams showing node positions for row-to-row interpolation (top left), node positions for column-to-column interpolation (bottom left), and a magnified resolution lattice (right) generated from the combined outputs of the row-to-row and column-to-column interpolations.

FIG. 12 presents a table comparing peak signal to noise (PSNR) results (in dB) for several sample images using 1DCGI and other methods.

Figure 2:
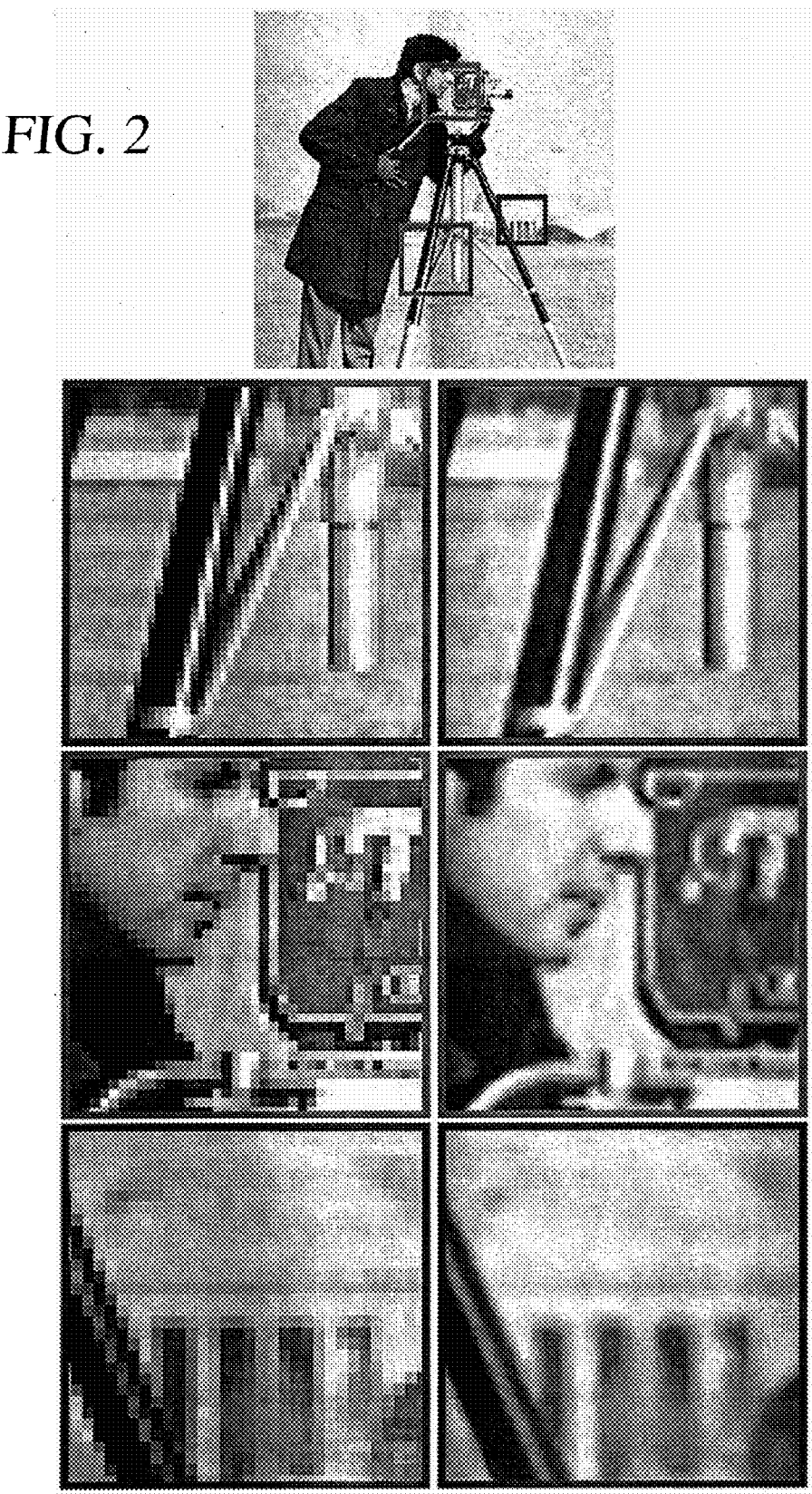
FIG. 2 presents an illustration highlighting differences between nearest neighbor interpolation (left) and the proposed 1DCGI method (right).

For simplicity and clarity of illustration, the drawing figures herein illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled;

two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

Description

I. Introduction

Image resolution limits the extent to which zooming enhances clarity, restricts the quality of digital photograph enlargements, and, in the context of medical images, can prevent a correct diagnosis. Interpolation can artificially increase image resolution but is generally limited in terms of enhancing image clarity or revealing higher frequency content. Algorithmic designs must balance qualitative improvements, accuracy, artifacts, and complexity for the desired application. Edge fidelity is one of the most critical components of subjective image quality and a number of edge-preserving and edge-directed interpolation methods have achieved varying degrees of success.

Mechanisms for interpolation can be broadly classified as model-based or non-model-based. Model-based interpolators use regularization to enforce models of image structure or formation and other a priori constraints. Model-based methods encompass a wide range of approaches from total image statistics to pixel-by-pixel classifications. Training data-sets are frequently employed, methods are typically iterative, and calculations often involve the full image or multiple regions of the image simultaneously. The support structure and computation time for model-based methods can be prohibitive for resource-limited applications for the internet or consumer electronics markets. Non-model-based methods, particularly the standard, fixed-kernel linear operators, are typically used for those applications.

Non-model-based methods can be further categorized as scene-based or object-based. Scene-based or "classical" methods depend only on spatial relationships. They include nearest neighbor interpolation and the broad range of interpolators that are based on the theoretically optimal sine function (linear, cubic, spline, etc.). Linear and cubic interpolators are most common for real time and large scale (e.g. video) interpolation: they are efficient and perform consistently in terms of accuracy and feature preservation.

In contrast to scene-based methods, object-based methods preserve object features such as shapes, contours, and other pixel-to-pixel relationships. The difference between scene and object based interpolators is demonstrated in FIG. 1, where a two-times expansion is highlighted to demonstrate the fundamental difference between scene-based and object-based interpolators. In both cases, the outlined pixel void is filled by weighted combination (overlaid coefficients) of the neighboring pixels. A scene-based linear interpolation kernel weights each of the original pixels around an interpolant (red outline) equally, which amounts to interpolation both along and across the edge formed by the three, diagonally oriented, black pixels. In contrast, an object-based interpolator preserves edge integrity by only acting along the trajectory formed by the black pixels. Object-based feature preservation can be accomplished through active segmentation of object features prior to interpolation or through inherent mathematical properties of the interpolator. In general, object-based methods perform better than scene-based methods in terms of quantitative and qualitative metrics. However, they are generally more computationally demanding. The continual advancement of computing hardware has made the computational expense of object based methods less critical. Accordingly, their use in recent applications has grown.

Edge-based, isophote-based, and registration-based interpolators have received a great deal of attention. Edge-based interpolators promote interpolation along rather than across edges. Despite this consistent goal, different "edge-based" or "edge-directed" interpolators are implemented in a variety of ways. Some algorithms interpolate a pre-filtered edge-only or edge-enhanced image separately. Conversely, the image can be pre-interpolated and the edges then addressed later in the high resolution image. A number of methods employ adaptive kernels with weights based on covariance or other similarity metrics. Still others address "subpixel" edges explicitly, usually through a variably weighted but consistently sized kernel. Unfortunately, the mathematics and assumptions associated with such kernels can limit image resizing to factors of two.

Isophote-based or level-set interpolators are similar to edge-based methods in terms of the artifacts they avoid. The stair-stepping artifacts that are frequently observed after scene-based interpolations occur when interpolators are applied across edges; this introduces unnatural curvature into image isophotes. Isophote-based interpolation can be implemented as curvature correction within traditionally interpolated images. Alternatively, isophotes can also been used to define the orientation and weights for parallelogram-based kernels.

Image registration-based interpolation defines a transform that maps a source image to a target image or associated template. Registration-based interpolation uses this transform, which links one set of known data to a spatially or temporally related set, to generate super-resolution data along the transform. Using registration to accomplish interpolation assumes that data bounding interpolants have similar features that the registration algorithm can identify and link. As a result, registration-based interpolation is generally applied to interpolate between images in a volumetric data set or between frames of video. Between adjacent video frames, the connections represent motion vectors that link the time-varying locations of objects. In a single image, linked isointense pixels simply represent isophotes. Registering two neighboring lines of N pixels identifies N isophotes that connect the two lines.

The proposed methods and systems reduce the optical flow problem to a single dimension and identifies registration vectors (or imposed isophotes) along which interpolation can be performed. Deconstructing the interpolation problem in this way enables improved speed of execution through parallelization. The proposed method is an optimized one-dimensional implementation of Control Grid Interpolation (CGI), derived from two-dimensional forms for other applications. We refer to the new one-dimensional CGI interpolator presented herein as 1DCGI. The formulation presented here includes variable node spacing and a quality-based estimation weighting scheme. An updated validation, and expanded results, are also presented. Results from the algorithm are both visually appealing and quantitatively accurate, even in the presence of noise. The new method accommodates arbitrary scaling factors and mitigates the jagged edge artifacts that can accompany scene-based interpolators, as demonstrated in FIG. 2, where areas of the MIT cameraman image are enlarged 5, 6.5, and 8 times by nearest neighbor interpolation (left) and the proposed method (right). The new approach results in smoother edges while retaining details.

II. Implementation

A. Optical Flow with One Degree of Freedom

One defining feature of optical flow is the brightness constraint, which assumes that each intensity in the source data set is exactly preserved somewhere in the destination data set. The vector connecting each source and destination intensity defines a local transformation between the two. Interpolation is performed by placing weighted averages of the source and destination intensities along the "displacement" vector. Here the term displacement refers to the offset between the destination location and the nearest neighbor to the source location in the destination data set. When interpolating between slices, the through-plane displacement vector is of the form $[\alpha, \beta, \pm 1]$. When interpolating within a single image, the in-plane displacement vectors are of the form $[\alpha, \pm 1]$ and $[\pm 1, \beta]$, and are determined separately through four univariate optimization problems.

The brightness constraint in one-dimension can be expressed as $$I(x,y)=I(x+\alpha,y+1), \quad (1)$$

where a pixel from a row (y) is matched to a pixel in the row below (y+1) at a horizontal offset $\alpha$. The Taylor series expansion allows this equation to be rephrased with the displacement as an independent variable:

$$I(x, y) \approx I(x, y) + \frac{\partial I(x, y)}{\partial x}\alpha + \frac{\partial I(x, y)}{\partial y}. \quad (2)$$

This equation states that for any point (x, y), there exists a displacement a such that the change in brightness from point (x, y) to point (x, y+1) is offset by the change in brightness from point (x, y) to point (x+α, y). Error (deviation from the approximated brightness constraint) is therefore defined as $$E(\alpha) = \left[ \frac{\partial I(x, y)}{\partial x}\alpha + \frac{\partial I(x, y)}{\partial y} \right]^2. \quad (3)$$

When error is zero, the displacement vector $\alpha$ is defined as $$\alpha = -\frac{\partial I(x, y)}{\partial y} \bigg/ \frac{\partial I(x, y)}{\partial x}. \quad (4)$$

Quantized approximations of the vector $[\alpha,1]$ at each new high-resolution location (where $\alpha$ is defined by Equation 4) form the foundation of orientation-adaptive methods. For 1DCGI, however, trajectories are defined originating at existing data points with no restrictions on angular resolution. Solutions for $\alpha$ are obtained iteratively and global smoothness is imposed through a control grid structure as described in the following subsection.

B. Control Points

Displacements are defined explicitly at control points, or nodes, and displacements for pixels in between nodes are generated with linear interpolation. This forces neighboring isophote curvatures to vary smoothly. If basis functions θ1 and θ2 are used to define the displacements between nodes x and x+k (where k is the node spacing), then the error associated with the selection of displacements $\alpha x$ and $\alpha x+k$ can be formulated as $$E(\alpha) = \sum_{i=0}^{k} \left[ \frac{\partial I(x+i, y)}{\partial x} [\alpha_x \ \alpha_{x+k}] \begin{bmatrix} \theta_1(i) \\ \theta_2(i) \end{bmatrix} + \frac{\partial I(x+i, y)}{\partial y} \right]^2. \quad (5)$$

For the linear case, basis functions θ1 and θ2 are $$\theta_1(i) = \frac{k-i}{k} \text{ and } \theta_2(i) = \frac{i}{k}. \quad (6)$$

where i indicates the distance from the previous node (0 to k). The displacement $\alpha x$ appears in the error calculations for two ranges, $\alpha x-k$ to $\alpha x$ and $\alpha x$ to $\alpha x+k$. Displacement solutions for a given row are identified as the set that corresponds to the lowest cumulative error for that entire row. More specifically, displacement solutions are obtained iteratively using the conjugate gradient method with an initial condition of zero displacements. It is noteworthy that if these initial conditions did not change, then the results of the proposed interpolator would be scene-based linear interpolation.

C. Adaptive Node Placement

Fixed node spacings (of uniform k) can result in node densities that are insufficient to characterize edge displacements in areas of high detail. Conversely, selecting a fixed node spacing that is too small increases computation time and can make interpolation overly sensitive to noise in areas of gradual variation. In addition to node density, node placement is also important to ensure that thin edges are well defined. Ideal node placements define displacements that match each edge direction and are minimally impacted by spurious noise. The proposed algorithm addresses these needs in two primary ways. The initial node locations are assigned within fixed k-sized windows so that each node corresponds to the largest row-to-row derivative in its window (for the row-to-row calculations).

The node placed in window i has location $$n_i = \underset{x \in w_i}{\text{argmax}}(|I_y(x)|), \quad (7)$$

where the window wi is defined as $$w_i=[(i-1)k+1. \ i*k].$$

This initialization places nodes on the pixels with the largest initial error (when $\alpha=0$. $E=I^2 y$). The sequence of nodes is always appended to include the first and last pixel.

Figure 3:
FIG. 3 presents an illustration of adaptive node placement for control grid node locations of the 1DCGI method, with dark spots for initial node placements, and light spots for bisected node placements.

Rows that are slower to converge are assumed to have additional details not accommodated by the initial node placements. After a fixed portion of the maximum allowed iterations has passed, the nodes in the highest error quartile are bisected. FIG. 3 shows an example adaptive node locations, with initial and bisected node placements, for the Monarch image. Dark circles mark the initial node locations. Lighter circles mark nodes added during later iterations.

D. Interpolation Along Displacement Vectors

All displacement vectors originate from pixels in the original resolution image. Displacements are usually non-integer, resulting in destinations that are off-grid. The off-grid intensities are determined from the neighboring, original resolution data using a one-dimensional cubic Hermite interpolator. New data are then calculated along the displacement vectors using linear interpolation. In the high resolution image H with grid spacing Δh, these intermediate points are defined based on original data in image I and a row-to-row-next displacement α as $$H(x+\alpha\Delta h, y+\Delta h)=(1-\Delta h)I(x,y)+(\Delta h)I(x+\alpha, y+1). \quad (8)$$

For the row-to-row cases, these data are positioned vertically where new, higher resolution rows will be formed, but are again, usually off-grid horizontally. The new, higher resolution pixels (i.e. H(x+Δh, y+Δh)) are interpolated from the off-grid rows using cubic Hermite interpolation. For noisy or highly detailed images, substitution of linear interpolation in place of cubic Hermite for off-grid calculations generally produces more accurate results (complete results not shown).

Figure 4:
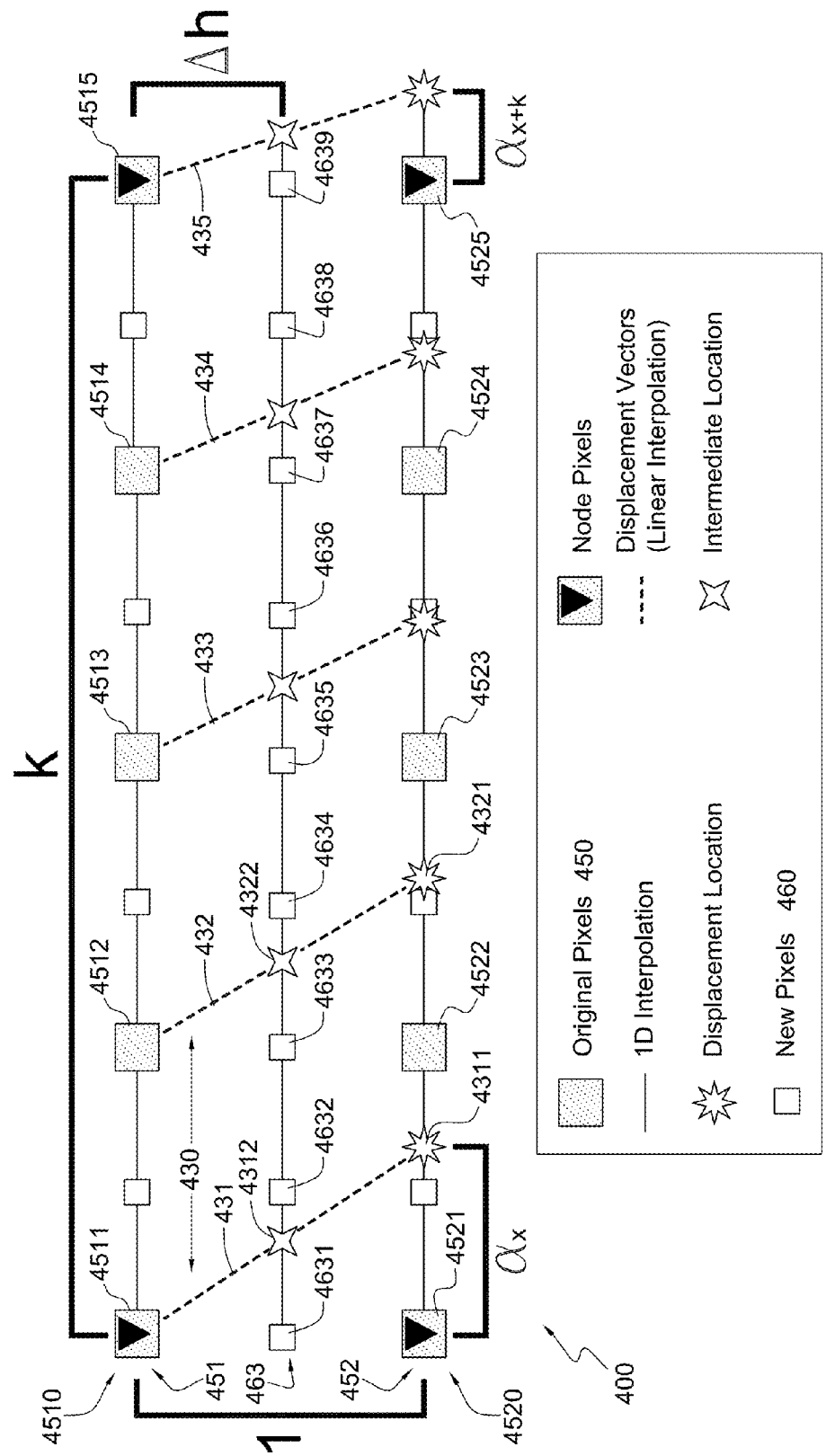
FIG. 4 illustrates a diagram of a magnified resolution lattice, and the different elements used by the 1DCGI method for generating new pixels based on optical flow displacement vectors.

FIG. 4 illustrates all of the methods and variables that are involved in the process, where the displacement vector [α,1] defines a connection between one node and a location in the next row. A data value is assigned at the connected location with one-dimensional interpolation (cubic Hermite, or linear). New data are calculated along the displacement vector by linear interpolation and then gridded to the high resolution lattice using the selected one-dimensional interpolator.

E. Combining Outputs

In place of rephrasing the brightness constraint and error equation to address the other displacement cases (row-to-row-previous, column-to-column-next, and column-to-column-previous), the image matrix can be transposed and/or flipped vertically. To address the row-to-row-previous displacements, the image is flipped. Both sets of column displacement calculations involve transposing the matrix with the column-to-column-previous reformulation also requiring that the image be flipped. Application of the appropriate transformation allows all four displacement sets to be calculated within the row-to-row-next interpolation framework that has been described. The properly oriented displacements are then retrieved by inverting the aforementioned transforms.

Merging the control nodes from the row and column interpolated images generates the "control grid" structure in the two-dimensional output image. FIG. 5 demonstrates the merging of nodes (solid triangles) on an expanded image lattice, where sample sets of control grids show node positions for row-to-row (top left) and column-to-column (bottom left) interpolation. The high-resolution (two times expanded) lattice (right) retains all of the original data and averages the two column-to-column and two row-to-row interpolated images. There are three types of input to output relationships: directly transferred or pre-existing data (gray squares), two-way directionally interpolated data (hollow triangles), and four-way directionally interpolated data (hollow stars). The row-to-row executions generate new directionally interpolated rows and the column-to-column executions generate new columns. Both methods use a one-dimensional interpolator (cubic Hermite by default) to stretch along the existing rows or columns as necessary.

In combining the four images, uniform or weighted averaging can be used. The results presented here were generated with weightings based on the mechanism of calculation for each pixel and on a quality metric. Each new point in the high resolution lattice (H(x,y)) is a combination of points from the images generated with row-to-row-next (Hr+), row-to-row-previous (Hr−), column-to-column-next (Hc+), and column-to-column-previous (Hc−) interpolation:

$$H(x,y)=w_r(H_{r_+}(x,y)+H_{r_-}(x,y))+w_c(H_{c_+}(x,y)+H_{c_-}(x,y)). \quad (9)$$

Weights for the row-based (wr) and column-based (wc) contributions to a pixel at (x,y) are defined as follows:

$$\text{if } (x,y) \notin \mathbb{Z} \begin{cases} w_r(x,y) = w_c(x,y) & \text{if } \Delta_r = \Delta_c \\ w_r(x,y) = 2w_c(x,y) & \text{if } \Delta_r < \Delta_c \\ w_r(x,y) = 1/2 w_c(x,y) & \text{if } \Delta_r > \Delta_c \end{cases} \quad (10)$$

$$\text{else } w_r(x,y) = w_c(x,y).$$

Pixels in the original image (both coordinates in the integer set, Z) are retained. The Δ terms are absolute differences between the row and column estimate pairs, and the weights must sum to unity:

$$\Delta_r = |H_{r_+}(x,y) - H_{r_-}(x,y)|,$$

$$\Delta_c = |H_{c_+}(x,y) - H_{c_-}(x,y)|$$

$$2*w_r + 2*w_c = 1.$$

For rows and columns containing data from the original resolution image (x or y in the integer set), all estimates are weighted equally. For pixels that are directionally interpolated with both row-based and column-based executions, the difference between the two row-to-row generated results is compared to the difference between the two column-to-column generated results, and the pair of results with better agreement is weighted twice as heavily.

III. Sample Methods and Systems

In one example, a method can comprise (1) establishing a first magnified resolution lattice from an original resolution lattice of an original image, (2) generating first new pixels in the first magnified resolution lattice via one dimensional interpolations between original pixels imported into the first magnified resolution lattice from the original image, and first displacement locations established by first optical flow displacement vectors extending within the first magnified resolution lattice, and/or (3) displaying an output image based on at least the first magnified resolution lattice.

In one example, a system can generate an output image based on an original image via an imaging application executable by one or more processing modules, where the original image and the imaging application can be store in one or more memory modules. Such system can comprise (1) a parsing module configured to establish a magnified resolution lattice from an original resolution lattice of the original image, (2) an optical flow displacement module configured to establish optical displacement vectors extending, within the magnified resolution lattice, between original pixels and optical displacement locations, the optical displacement vectors based on one-dimensional optical flow brightness constraint calculations for the original pixels, and/or (3) a new pixel generation module configured to generate new pixels in the magnified resolution lattice via one or more interpolations based on the optical displacement vectors.

In one example, a method can comprise generating a magnified resolution lattice of an image from an original resolution lattice of the image via one-dimensional control grid interpolation means. The one-dimensional control grid interpolation means can be configured to generate new pixels for the magnified resolution lattice based on interpolation of intensity pairs. Each of the intensity pairs of the magnified resolution lattice can comprise (1) an original pixel intensity of an original pixel imported into the magnified resolution lattice from the original resolution lattice, and (2) a displaced location intensity of a displaced location in the magnified resolution lattice, where the displaced location can be located at an end of an optical flow displacement vector extending from the original pixel, and the optical flow displacement vector can be generated via one-dimensional optical flow brightness constraint evaluation means.

Other examples and embodiments are further disclosed herein. Such examples and embodiments may be found in the figures, in the claims, and/or in the description of the present application.

Figure 6:
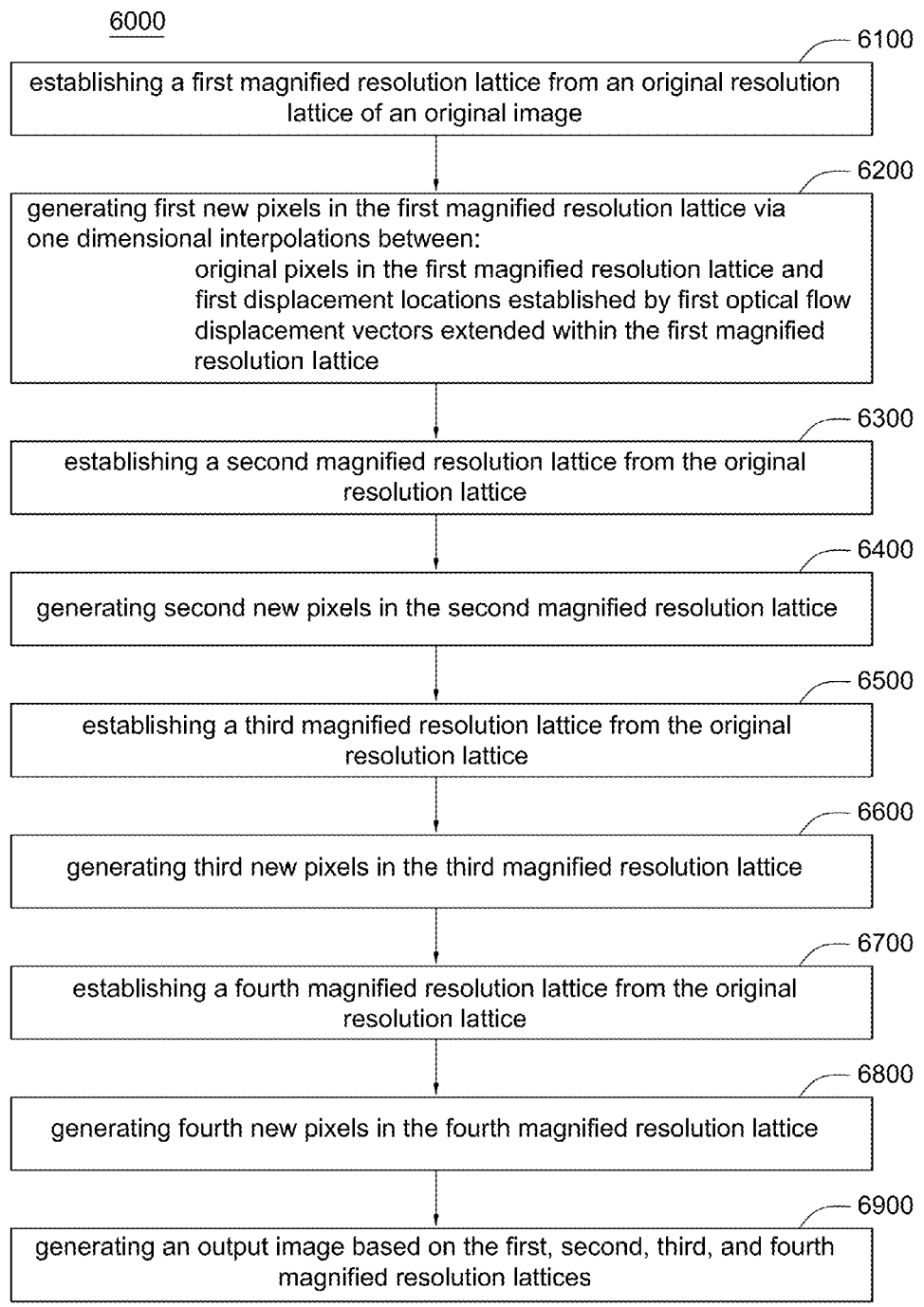
FIG. 6 presents a flowchart for a method of implementing a 1 DCGI imaging process.

Turning now to the flowchart in FIG. 6, an exemplary method 6000 is illustrated for implementing the 1DCGI approach described above. In some examples, method 6000 may be implemented by system 700 of FIGS. 7-8, where system 700 is configured for generating output image 722 based on original image 721 via imaging application 723 executable by one or more processing modules 710, where original image 721, new image 722, and/or imaging application 723 may be stored in the one or more memory modules 720 of system 700. In such examples, original image 721 can be a true original image, a previously edited or modified image, or a copy of any of the same. Furthermore, in such examples, system 700 may comprise a computer system or a computer, like computer 800 illustrated in FIGS. 8-9, for executing method 6000. In one embodiment, the computer system can comprise multiple computers.

Figure 7:
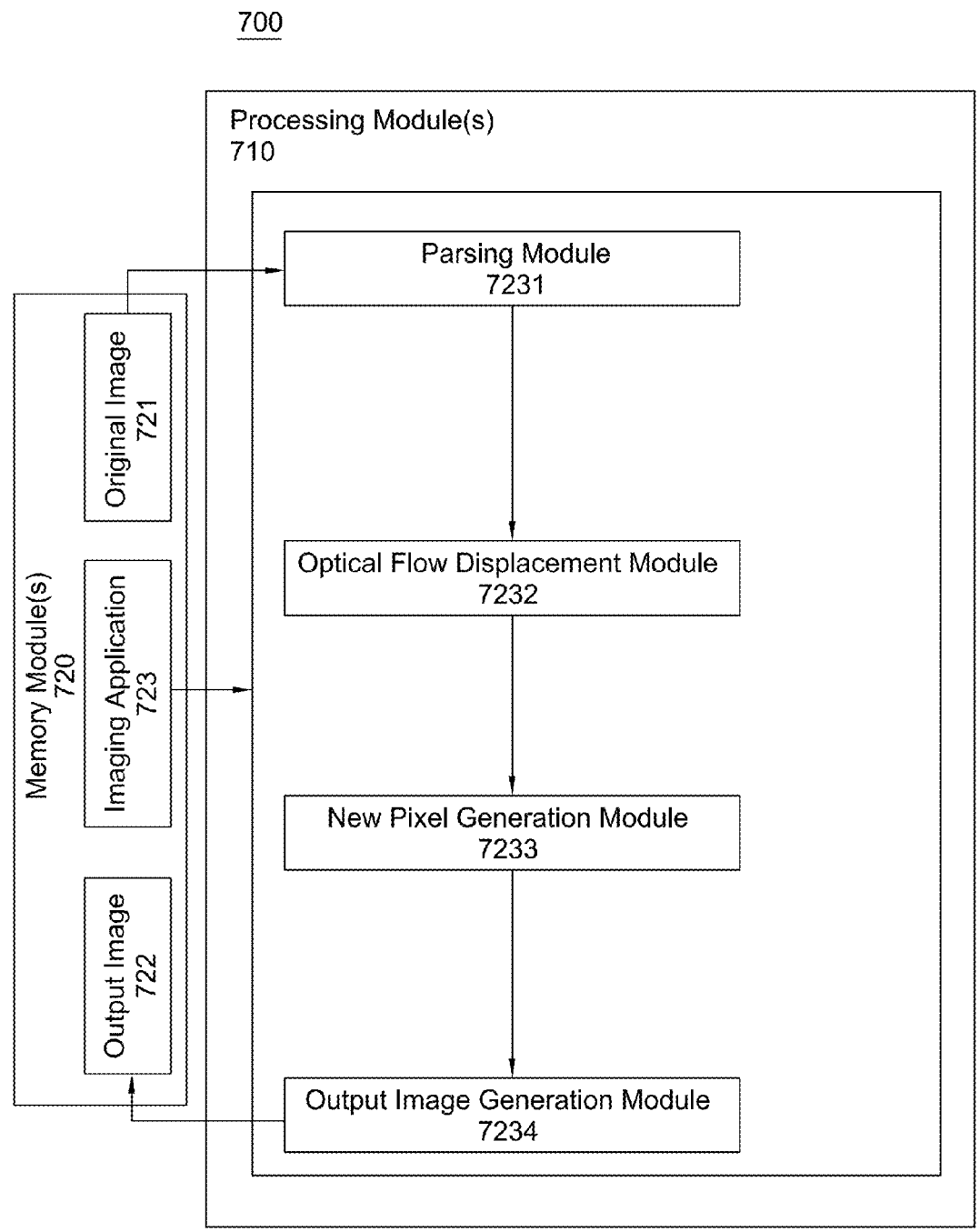
FIG. 7 presents a diagram of a system for implementing the method of FIG. 6.
Figure 9:
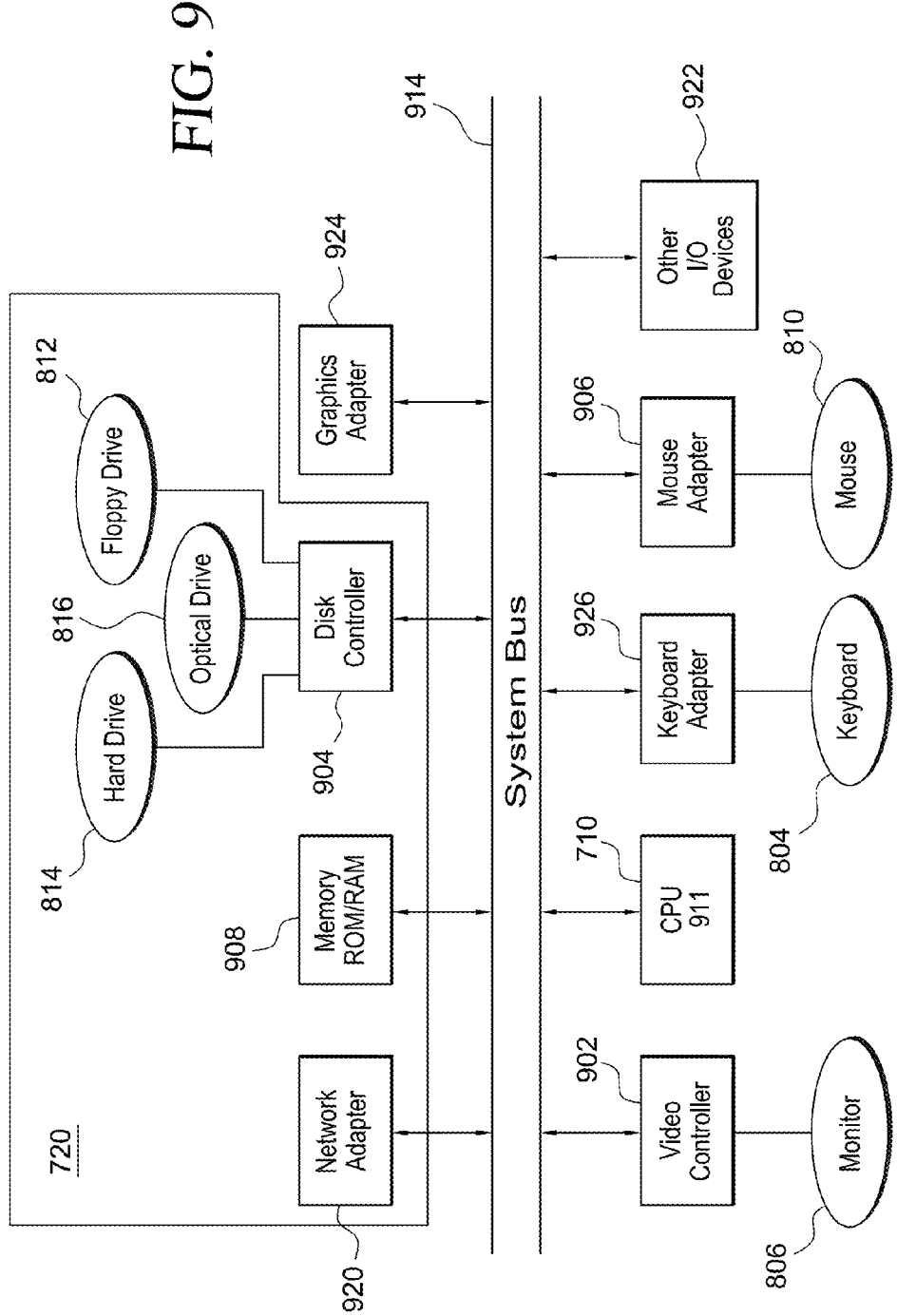
FIG. 9 presents a diagram of components for the computer of FIG. 8.

Computer 800 includes a chassis 802 containing one or more circuit boards (not shown), a floppy drive 812, an optical drive 816, such as a CD-Rom or a DVD-Rom drive, and a hard drive 814. In some embodiments, hard drive 814 can comprise one of the one or more memory modules 720 (FIG. 7). A representative block diagram of the elements included on the circuit boards inside chassis 802 is shown in FIG. 9. Central processing unit (CPU) 911 is shown coupled to system bus 914, and may comprise one or the one or more processing modules 710 (FIG. 7). In various embodiments, the architecture of CPU 911 can be compliant with any of a variety of commercially distributed architecture families including the RS/6000 family, the Motorola 68000 family, the Intel x86 family, and other families.

System bus 914 also is coupled to memory 908, where memory 908 includes both read only memory (ROM) and random access memory (RAM). Non-volatile portions of memory 908 or the ROM can be encoded with a boot code sequence suitable for restoring computer 800 (FIG. 8) to a functional state after a system reset. In addition, memory 908 can include microcode such as a Basic Input-Output System (BIOS).

Figure 8:
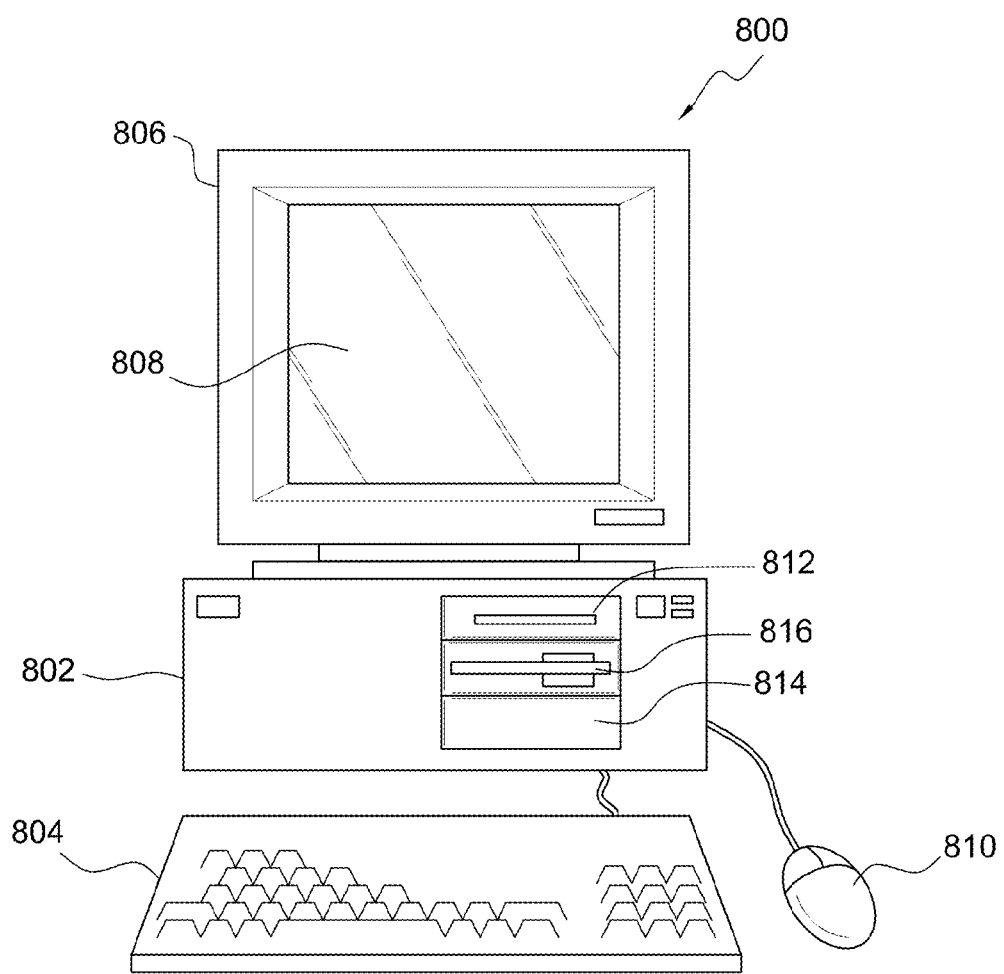
FIG. 8 presents an illustration of a computer configurable to execute the system of FIG. 7.

In the depicted embodiment of FIG. 9, various I/O devices such as a disk controller 904, a graphics adapter 924, a video controller 902, a keyboard adapter 926, a mouse adapter 906, a network adapter 920, and other I/O devices 922 can be coupled to system bus 914. Keyboard adapter 926 and mouse adapter 906 are coupled to keyboard 804 (FIGS. 8-9) and mouse 810 (FIGS. 8-9), respectively, of computer 800 (FIG. 8). While graphics adapter 924 and video controller 902 are indicated as distinct units in FIG. 9, video controller 902 can be integrated into graphics adapter 924, or vice versa in other embodiments. Video controller 902 is suitable for refreshing monitor 806 (FIGS. 8-9) to display images on screen 808 of computer 800 (FIG. 8). Disk controller 904 can control hard drive 814 (FIGS. 8-9), floppy drive 812 (FIGS. 8-9), and optical drive 816 (FIGS. 3-4). In other embodiments, distinct units can be used to control each of these devices separately.

In some examples, the one or more memory modules 720 of system 700 (FIG. 7) may be comprised by one or more elements of computer 800 (FIG. 8), such as by hard drive 814, floppy drive 812, optical drive 816, memory 908, and/or by another memory device coupled via network adapter 920.

When computer 800 (FIGS. 8-9) is operated, program instructions stored in the one or more memory modules 720 can be executed by CPU 911. A portion of the program instructions stored on these devices can be suitable for carrying out imaging application 723 (FIG. 7) and/or method 6000 (FIG. 6).

Although many other components of computer 800 (FIGS. 8-9) are not shown, such components and their interconnection are well known to those of ordinary skill in the art. Accordingly, further details concerning the construction and composition of computer 800 and the circuit boards inside chassis 802 are not discussed herein. In addition, although computer 800 is illustrated as a desktop computer in FIG. 8, there can be examples with different form factors while still having functional elements similar to those described for computer 800.

Backtracking to FIG. 6, Method 6000 comprises block 6100 for establishing a first magnified resolution lattice from an original resolution lattice of an original image. In some examples, the first magnified resolution lattice can be similar to magnified resolution lattice 400 of FIG. 4 In the same or other examples, magnified resolution lattice 400 may be generated by processing module(s) 710 via parsing module 7231 (FIG. 7). For instance, magnified resolution lattice 400 may be derived by parsing module 7231 from an original resolution lattice of original image 721, such that magnified resolution lattice comprises original pixels 450 (FIG. 4) acquired from the original resolution lattice of original image 721.

In some examples, block 6100 can comprise establishing control node pixels for a control grid throughout the first magnified resolution lattice, where the original pixels in the first magnified resolution lattice comprise the control node pixels, including the first node pixel. In the example of FIG. 4, the control node pixels comprise node pixels 4511 and 4515 in row 451, and node pixels 4521 and 4525 in row 452. In FIG. 4, the control node pixels are fixedly spaced apart from each other, where node pixel 4511 is also spaced apart from node pixel 4515 by distance k, and where node pixel 4521 is spaced apart from node pixel 4525 by distance k. There may be other embodiments where control node pixels may be adaptively spaced apart from each other, such as described above, in Section II.C.

Method 6000 also comprises block 6200 for generating first new pixels in the first magnified resolution lattice via one dimensional interpolations between original pixels in the first magnified resolution lattice and first displacement locations established by first optical flow displacement vectors extended within the first magnified resolution lattice. In the present example, for magnified resolution lattice 400 (FIG. 4), the first new pixels can be similar to new pixels 460, and the original pixels can be similar to original pixels 450. The first optical flow displacement vectors can be similar to displacement vectors 430, extending within magnified resolution lattice 400, and may be derived from 1DCGI methodology and optical flow brightness constraint calculations. In some examples, the first optical flow displacement vectors, such as displacement vectors 430 (FIG. 4), may be generated by optical flow displacement module 7232 (FIG. 7). In the same or other examples, the first new pixels, such as one or more of new pixels 460 (FIG. 4), may be generated by new pixel generation module 7233 (FIG. 7).

Figure 10:
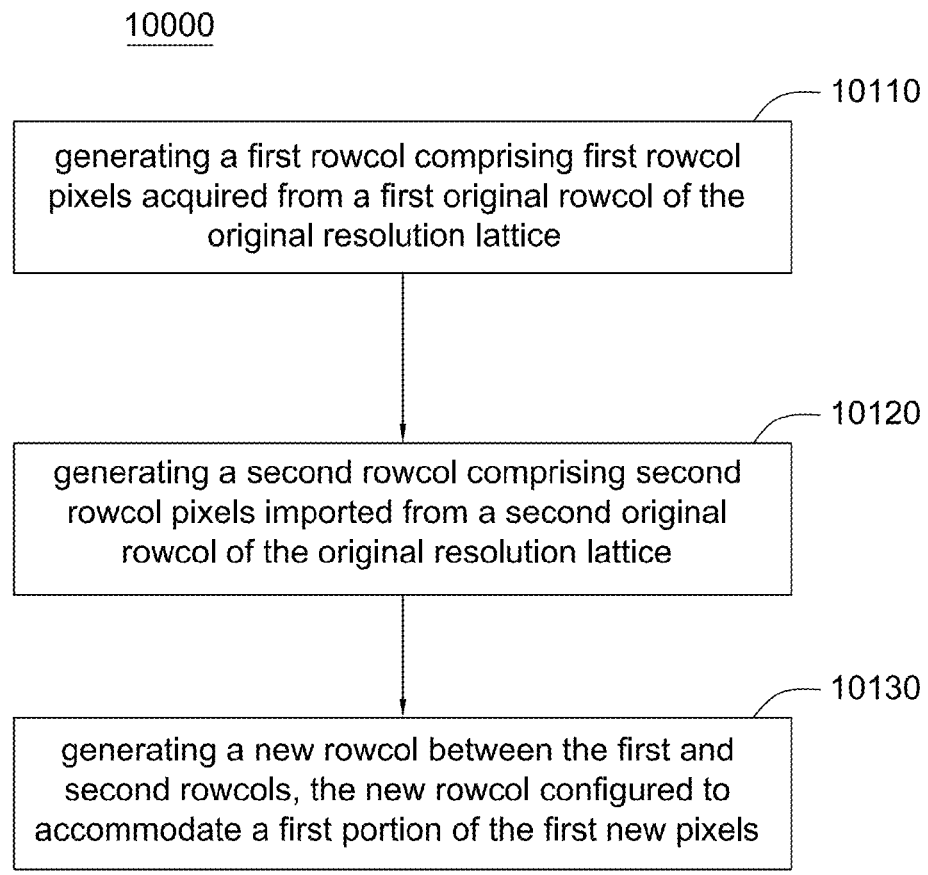
FIG. 10 presents a flowchart of a method for carrying out a first portion of the method of FIG. 6.
Figure 11:
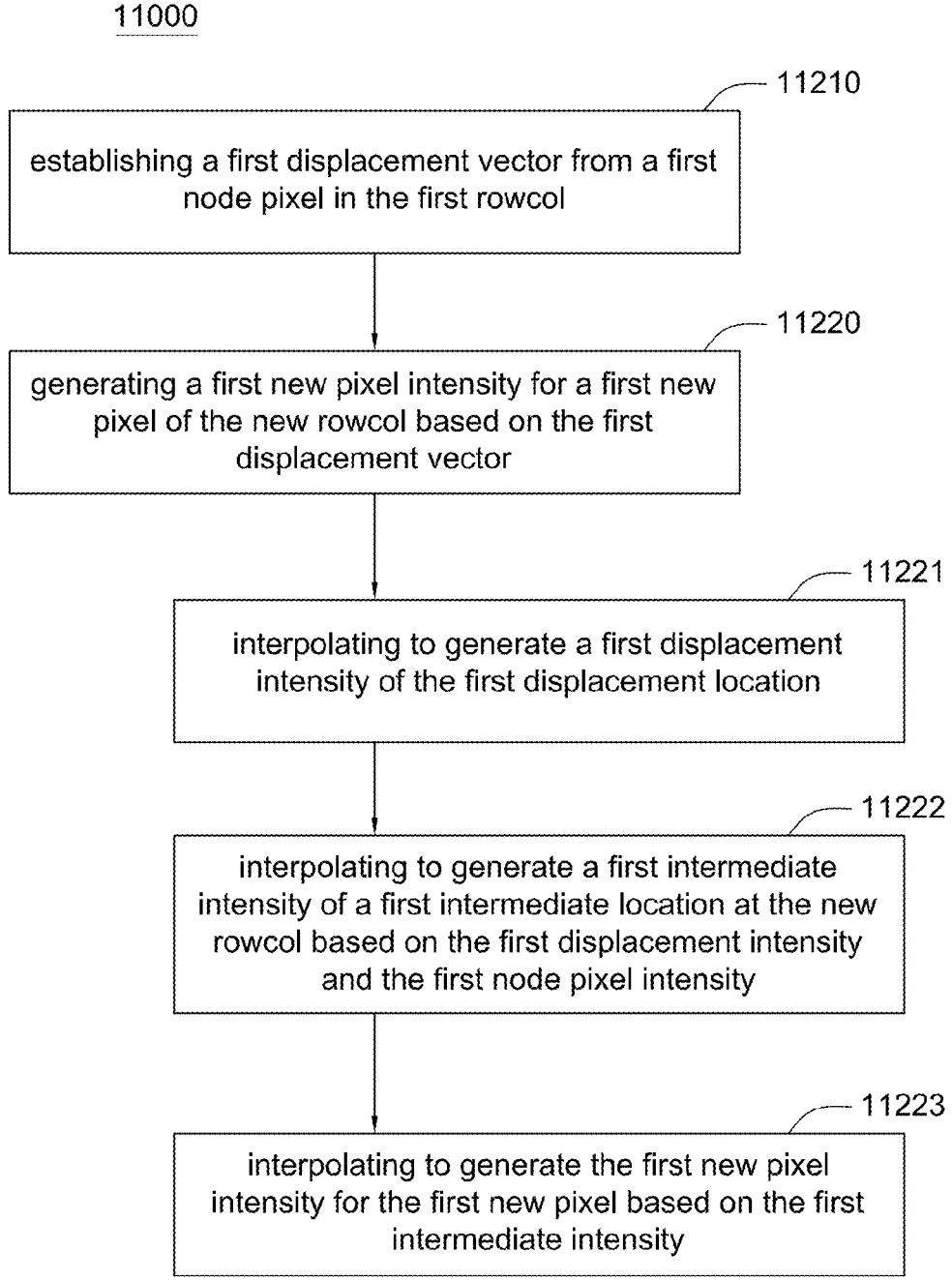
FIG. 11 presents a flowchart of a method for carrying out a second portion of the method of FIG. 6.

In some examples, some of the blocks of method 6000 (FIG. 6) may comprise further sub-blocks. For example, FIG. 10 illustrates a diagram of a flowchart of method 10000 for implementing block 6100 of method 6000. FIG. 11 illustrates a diagram of a flowchart of method 11000 for implementing block 6200 of method 6000.

With respect to method 10000 (FIG. 10) for implementing block 6100 of method 6000 (FIG. 6), block 10110 comprises generating a first rowcol comprising first rowcol pixels imported from a first original rowcol of the original resolution lattice. As used herein, the term "rowcol" is a genus term, where the terms "row" and "column" are species of the genus rowcol. As a result, the term rowcol may stand for "row" in some implementations, and may stand for "column" in other implementations. In the example of FIG. 4, the first rowcol can be represented by row 451, such that the first rowcol pixels are represented by row pixels 4510 of row 451. Row pixels 4510 comprise original pixels 4511-4515, including node pixels 4511 and 4515, imported into magnified resolution lattice 400 from the original resolution lattice of original image 721 (FIG. 7).

Block 10120 of method 10000 comprises generating a second rowcol comprising second rowcol pixels imported from a second original rowcol of the original resolution lattice. In the example of FIG. 4, the second rowcol can be represented by row 452, such that the second rowcol pixels are represented by row pixels 4520 of row 452. Row pixels 4520 comprise original pixels 4521-4525, including node pixels 4521 and 4525, imported into magnified resolution lattice 400 from the original resolution lattice of original image 721 (FIG. 7).

Block 10130 of method 10000 comprises generating a new rowcol between the first and second rowcols, the new rowcol configured to accommodate a first portion of the first new pixels. In the example of FIG. 4, the new rowcol can be similar to new row 463 between rows 451-452, and the first portion of the first new pixels comprises new pixels 4631-4639, when first generated, intensities for the new pixels of new row 463 are blank, to be determined by the rest of method 6000.

With respect to method 11000 (FIG. 11) for implementing block 6200 of method 6000 (FIG. 6), block 11210 comprises establishing a first displacement vector from a first node pixel in the first rowcol. In the example of FIG. 4, the first displacement vector can be similar to displacement vector 431 of displacement vectors 430 (FIG. 4), and the first node pixel can be similar to node pixel 4511 of row pixels 4510.

In some examples, block 11210 can also comprise establishing a first displacement location in the second rowcol at an end of the first displacement vector. In the example of FIG. 4, the first displacement location can comprise displacement location 4311 at the end of displacement vector 431, where displacement vector 431 extends within magnified resolution lattice 400 between node pixel 4511 and displacement location 4311.

The first displacement vector of block 11210 comprises one of the first optical flow displacement vectors of block 6200 (FIG. 6), and is thus established based on optical-flow brightness constraints for the first rowcol pixels of block 10110 (FIG. 10). Based on the optical-flow brightness constraint for the first node pixel in the first rowcol, the first displacement location at the second rowcol can be established via block 11210. In some examples, establishing the first displacement location can comprise (1) determining a nearest neighbor pixel for the first node pixel, the nearest neighbor pixel being one of the second rowcol pixels at the second rowcol and, out of the second rowcol pixels, nearest to the first node pixel, (2) determining a first offset displacement to separate the nearest neighbor pixel from the first displacement location and (3) establishing the first displacement location in the second rowcol, separated from the nearest neighbor pixel by the offset displacement.

In the example of FIG. 4, the nearest neighbor pixel for node pixel 4511 would be node pixel 4521, being closest to node pixel 4511 out of the pixels in row 452. The first offset displacement would correspond to $\alpha_x$, determined based on a one-dimensional optical flow brightness constraint calculation relative to node pixel 4511, based on Equations 1-4. With $\alpha_x$ established, displacement location 4311 can be established in row 452, separated from nearest neighbor node pixel 4521 by $\alpha_x$.

In some implementations, block 11210 can be implemented to establish displacement locations and displacement vectors based on optical flow brightness constraints calculated for each of the original pixels of the first rowcol. There can be other implementations, however, that establish displacement vectors for each of the original pixels of the first rowcol based on optical flow brightness constraints calculated only for the for node pixels of the first rowcol. As an example, in FIG. 4, displacement vector 431 is established by calculating $\alpha_x$ for node pixel 4511, and displacement vectors 432-434 are established for original pixels 4512-4514, respectively, based on the $\alpha_x$ as calculated for node pixel 4511. Node pixel 4515, being a node pixel, would have its displacement vector 435 established by calculating $\alpha_{x+k}$ for node pixel 4515, rather than relying on the $\alpha_x$ as calculated for node pixel 4511, and where $\alpha_{x+k}$ can be used to calculate other displacement vectors and locations for other original pixels of row 451 proximate to node pixel 4515. Such an approach may expedite and/or simplify the execution of method 6000.

Block 11220 of method 11000 (FIG. 11) comprises generating a first new pixel intensity for a first new pixel of the new rowcol based on the first displacement vector. In the example of FIG. 4, the first new pixel can be, for example new pixel 4632, as determined from one or more interpolations based on displacement vectors 430. In some examples block 11220 can comprise one or more to the following sub-blocks.

Sub-block 11221 of block 11220 comprises interpolating to generate a first displacement intensity of the first displacement location. In the example of FIG. 4, the first displacement location can comprise displacement location 4311, and the first displacement intensity can comprise an intensity for displacement location 4311, generated by interpolating based on row pixels 4520 of row 452. In the same or other examples, the first displacement intensity can be via one-dimensional interpolation based on one or more of the second rowcol pixels that neighbor the first displacement location. As an example, the intensity for displacement location 4311 can be generated via interpolation based on node pixels 4521 and 4522 that neighbor displacement location 4311 in row 452. In some examples, sub-block 11221 of block 11220 may be carried out by a first interpolation module of new pixel generation module 7233, as image application 723 is executed by the one or more processing modules 710 in system 700 (FIG. 7).

Sub-block 11222 of block 11220 comprises interpolating to generate a first intermediate intensity of a first intermediate location at the new rowcol based on the first displacement intensity and the first node pixel intensity. In the example of FIG. 4, the first intermediate intensity can comprise an intensity of intermediate location 4312, where intermediate location 4312 is located at row 463 along the path of displacement vector 431. The intensity of intermediate location 4312 can be generated by interpolation based on the intensity of displacement location 4311 in row 452 and the intensity of node pixel 4511 in row 451, where such interpolation can comprise linear interpolation in some examples. In some examples, the intensity of other intermediate locations, such as intermediate location 4322, can be determined similarly to that of intermediate location 4321, but via interpolations based on other displacement vectors, such as displacement vector 432 extended between original pixel 4512 of row 451 and displacement location 4321 at row 452. In some examples, sub-block 11222 of block 11220 may be carried out by a second interpolation module of new pixel generation module 7233, as image application 723 is executed by the one or more processing modules 710 in system 700 (FIG. 7).

Sub-block 11223 of block 11220 comprises interpolating to generate the first new pixel intensity for the first new pixel based on the first intermediate intensity. In the example of FIG. 4, the first new pixel intensity can comprise an intensity of new pixel 4632 at row 463, and can be determined by interpolating based on the intensities of intermediate locations at row 463, such as intermediate locations 4312 and 4322 that neighbor new pixel 4632. In the same or other examples, the interpolation to generate the first new pixel intensity can comprise a cubic Hermite interpolation. In some examples, sub-block 11223 of block 11220 may be carried out by a third interpolation module of new pixel generation module 7233, as image application 723 is executed by the one or more processing modules 710 in system 700 (FIG. 7).

As described above, the term rowcol can refer to either rows or columns of a magnified resolution lattice, depending on the implementation. Accordingly, in some examples, with respect to the first, second, and new rowcols described above for blocks 10110, 10120, and 10130 (FIG. 10), the first rowcol of the first magnified resolution lattice can comprise a first row comprising first row pixels from a first original row of the original resolution lattice, the second rowcol can comprise a second row comprising second row pixels from a second original row of the original resolution lattice, and the new rowcol can comprise a new row between the first and second rows in the magnified resolution lattice. Such an implementation can be similar to the row-to-row-next (RRN) implementation described above with respect to FIG. 4, where displacement vectors 430 extend downward from row 451 to row 452, and where row 452 lies below row 451.

An alternate row-to-row-previous (RRP) implementation could also be performed similarly to the RRN implementation, but inverting the roles of rows 451 and 452. In such an RRP implementation, RRP displacement vectors, similar to RRN displacement vectors 430, would be established to satisfy an optical flow brightness constraint for the node pixels of row 452, but would instead extend upwards from the node pixels in row 452 to displacement locations in row 451 above row 452. From such RRP displacement vectors, intensity values could then be calculated for new pixels 4631-4639 in row 463 using interpolations similar to those described above for the RRN implementation of FIG. 4.

There can also be examples where the term rowcol can refer to columns, rather than rows. For instance, with respect to the first, second, and new rowcols described above for blocks 10110, 10120, and 10130 (FIG. 10), the first rowcol of the magnified resolution lattice can comprise a first column comprising first column pixels from a first original column of the original resolution lattice, the second rowcol can comprise a second column comprising second column pixels from a second original column of the original resolution lattice, and the new rowcol can comprises a new column between the first and second columns in the magnified resolution lattice. Such column-based implementations could comprise either a column-to-column-next (CCN) implementation, or a column-to-column-previous (CCP) implementation.

For a CCN implementation, CCN displacement vectors, similar to RRN displacement vectors 430 (FIG. 4), would be established to satisfy an optical flow brightness constraint for the node pixels of a first pixel column, extending rightwards from the node pixels of the first pixel column to displacement locations in a second pixel column to the right of the first pixel column. From such CCN displacement vectors, intensity values could then be calculated for new pixels in a new column located between the first and second pixel columns, using interpolations similar to those described above for the RRN implementation of FIG. 4.

For a CCP implementation, CCP displacement vectors, similar to RRN displacement vectors 430 (FIG. 4), would be established to satisfy an optical flow brightness constraint for the node pixels of the second pixel column, extending leftwards from the node pixels of the second pixel column to displacement locations in the first pixel column to the left of the second pixel column. From such CCP displacement vectors, intensity values could then be calculated for new pixels in the new column located between the first and second pixel columns, using interpolations similar to those described above for the RRN implementation of FIG. 4.

Continuing with method 6000 (FIG. 6), block 6300 comprises establishing a second magnified resolution lattice from the original resolution lattice, and block 6400 comprises generating second new pixels in the second magnified resolution lattice. Block 6500 comprises establishing a third magnified resolution lattice from the original resolution lattice, and block 6600 comprises generating third new pixels in the second magnified resolution lattice. Block 6700 comprises establishing a fourth magnified resolution lattice from the original resolution lattice, and block 6800 comprises generating fourth new pixels in the second magnified resolution lattice. Finally, block 6900 comprises generating an output image based on the first, second, third, and fourth magnified resolution lattices. In some examples, generating the output image in block 6900 can comprise block displaying the output image based on at least one of the first, second, third, and/or fourth magnified resolution lattices of respective blocks 6200, 6400, 6600, and/or 6800. For instance, the output image may be displayed on a display such as screen 808 of computer 800 (FIGS. 8-9).

There can be more than one approach for implementing the blocks of method 6000, as described below.

i. First Approach

In a first approach for method 6000, the first, second, third, and fourth magnified resolution lattices of blocks 6100, 6300, 6500, and 6700 are initially established to be the same as each other. The first, second, third, and fourth new pixels of blocks 6200, 6400, 6600, and 6800 are then calculated using different ones of the RRN, RRP, CCN, and CCP implementations.

As an example, as described above, block 6200 can comprise generating the first new pixels of the first magnified resolution lattice via an RRN implementation, wherein a second RRN row is located below the first RRN row, and RRN displacement vectors are generated to extend downwards from the first RRN row to the second RRN row. Block 6200 can be implemented as illustrated and described above with respect to FIG. 4 in some examples.

In the same or other examples, block 6400 can comprise generating the second new pixels of the second magnified resolution lattice via an RRP implementation, wherein a second RRP row is located above the first RRP row, and RRP displacement vectors are generated to extend upwards from the first RRP row to the second RRP row.

In the same or other examples, block 6600 can comprise generating the third new pixels of the third magnified resolution lattice via a CCN implementation, wherein a second CCN column is located right of the first CCN column, and CCN displacement vectors are generated to extend rightwards from the first CCN column to the second CCN column.

In the same or other examples, block 6800 can comprise generating the fourth new pixels of the fourth magnified resolution lattice via a CCP implementation, wherein a second CCP column is located left of the first CCP column, and CCP displacement vectors are generated to extend leftwards from the first CCP column to the second CCP column.

For block 6900, the output image can comprise original output pixels from the original image, and new output pixels derived from the first, second, third, and fourth pixels of blocks 6200, 6400, 6600, and 6800. As an example, each of the new output pixels is generated from a weighted average calculation based on at least one of: (1) a corresponding pixel of the first new pixels from block 6200, (2) a corresponding pixel of the second new pixels from block 6400, (3) a corresponding pixel of the third new pixels from block 6600, or (4) a corresponding pixel of the fourth new pixels from block 6800.

ii. Second Approach

In a second first approach for method 6000, the first, second, third, and fourth magnified resolution lattices of blocks 6100, 6300, 6500, and 6700 are initially established to be different from each other.

For example, the first magnified resolution lattice of block 6100 can be established based on the original orientation of the original resolution lattice. The second magnified resolution lattice of block 6300 can be established as flipped relative to the first magnified resolution lattice of block 6100. The third magnified resolution lattice of block 6500 can be established as transposed relative to the first magnified resolution lattice of block 6100. The fourth magnified resolution lattice of block 6700 can be established as flipped and transposed relative to the first magnified resolution lattice of block 6100.

Once flipped and/or transposed as described above, new pixels for the first, second, third, and fourth magnified resolution lattices can be generated in blocks 6200, 6400, 6600, and 6800, respectively, via interpolations based on respective first, second, third, and fourth optical flow displacement vectors. Such interpolations and optical flow displacement vectors can be generated, for example, using a single one of the RRN, RRP, CCN, or CCP implementations for each of blocks 6200, 6400, 6600, 6800. As an example, the RRN implementation described above with respect to FIG. 4 can be used to generate the first optical flow displacement vectors and the first new pixels in block 6200, the second optical flow displacement vectors and the second new pixels in block 6400, the third optical flow displacement vectors and the third new pixels in block 6600, and the fourth optical flow displacement vectors and the fourth new pixels in block 6800, thereby avoiding the need to perform different ones of the RRN, RRP, CCN, and CCP implementations for different ones of the first, second, third, and fourth magnified resolution lattices.

Once the first, second, third, and fourth new pixels have been respectively generated in blocks 6200, 6400, 6600, and 6800, the second, third and fourth magnified resolution lattices can be transformed to the original orientation of the original resolution lattice by flipping the second magnified resolution lattice, transposing the third magnified resolution lattice, and flipping and transposing the fourth magnified resolution lattice.

For block 6900, the output image can comprise original output pixels from the original image, and new output pixels derived from the first, second, third, and fourth pixels of blocks 6200, 6400, 6600, and 6800. As an example, each of the new output pixels can generated from a weighted average calculation based on at least one of: (1) a corresponding pixel of the first new pixels from block 6200, (2) a corresponding pixel of the second new pixels from block 6400, (3) a corresponding pixel of the third new pixels from block 6600, or (4) a corresponding pixel of the fourth new pixels from block 6800.

In some examples, whether following the first or second approaches described above, one or more blocks of method 6000 can be carried out in parallel. As an example, blocks 6100, 6300, 6500, and/or 6700 may be carried out concurrently. In the same or other examples, blocks 6200, 6400, 6600, and/or 6800 may be carried out concurrently.

In some examples, the first, second, third, and fourth new pixels of blocks 6200, 6400, 6600, and/or 6800 (FIG. 6) may be generated via one or more processors executing an imaging application, such as via the one or more processing modules 710 and imaging application 723 of system 700 (FIG. 7). In such examples, the one or more processors may have access to the original image and the imaging application via the one or more memory modules. In the same or other examples, the output image of block 6900 (FIG. 6) can be stored in one or more memory modules, such as in at least a portion of the one or more memory modules 720 of system 700 (FIG. 7).

Once generated in block 6900 (FIG. 6), the output image can be used for several different purposes. As an example, the new output pixels of the output image may represent one or more portions of a physical article when the original image depicts at least a part of the physical article. For instance, where the original image is a medical image, such as an X-ray image, the original pixels of the original image may represent one or more tissues, such as bone tissue. As a result, at least a portion of the new output pixels will also represent magnified portions of such tissues, permitting less distortion when zooming or magnifying the output image from the original image, to allow for more accurate diagnosis by reviewing medical practitioners.

In some examples, one or more of the different blocks of methods 6000, 10000, and/or 11000 may be combined into a single block or performed simultaneously, and/or the sequence of such blocks can be changed. In the same or other examples, some of the blocks of one or more of methods 6000, 10000, and/or 11000 can be subdivided into several sub-blocks. There can also be examples where one or more of methods 6000, 10000, and/or 11000 can comprise further or different blocks. In addition, there may be examples where one or more of 6000, 10000, and/or 11000 can comprise only part of the steps described above. Other variations can be implemented for methods 6000, 10000, and/or 11000 without departing from the scope of the present disclosure.

IV. Results

Low resolution images were generated by downsampling standard test images.

The decimated images were then scaled back to original resolution with the proposed 1DCGI method as well as bilinear, bicubic, NEDI, and iNEDI interpolators. Scaling factors of two, three, and four were used to expand each decimated image. NEDI and iNEDI are only compatible with scaling factors of two. 1DCGI is compatible with arbitrary scaling factors as shown in FIG. 2.

Error and iteration limits were fixed for all scaling factors at 1% and 50 respectively. The initial node window size was modified to account for the smaller test images corresponding to higher expansion factors. Node selection windows were 25, 17, and 13 pixels wide for two-times, three-times, and four-times expanded images. Node splitting was performed every 13 iterations for two-times and three-times expanded images, and every 17 iterations for four-times expanded images. All parameters were determined empirically based on a larger collection of test images.

Interpolated images were compared to the originals using PSNR:

$$PSNR = 20 \cdot \log_{10}\left(\frac{MAX_I}{\sqrt{MSE}}\right), \quad (11)$$

where MAXI is the maximum possible pixel intensity and MSE is mean squared error. Results are detailed in Table I. The relative difference in mean squared error between 1DCGI and the best alternative methods (based on PSNR) is also shown. The relative difference in MSE between method (A) and method (B) is defined as $$r_{A,B} = \begin{cases} -100\left(1 - \frac{B}{A}\right) & \text{if } A > B \\ 100\left(1 - \frac{A}{B}\right) & \text{if } A < B. \end{cases} \quad (12)$$

For all images and scaling factors in FIG. 12, the average improvement in MSE achieved by 1DCGI relative to the best alternative method is of approximately 3.24%. In comparison to each individual method, 1DCGI produces significantly (>5%) lower MSE. Relative to iNEDI, the average improvement is of approximately 10.27%.

For high-detail or noisy images, 1DCGI performs better with cubic interpolation steps replaced by linear interpolation. With the decimated test images corrupted by Gaussian white noise (SNR of 30 dB) prior to resizing, the average overall improvement in MSE associated with 1DCGI-linear is of approximately 5.46% (complete results not shown). In contrast, standard 1DCGI resulted in an overall average r-value of approximately 2.48%. Bilinear interpolation always produced the second highest PSNR for the noisy data.

Figure 14:
FIG. 14 illustrates a comparison between original test images (top row) image processing results from iNEDI (middle row) and 1DCGI (bottom row) methods for the Lena image and the monarch butterfly image.
Figure 15:
FIG. 15 illustrates a comparison between a four-times downsampled Lena test image (top), an iNEDI interpolation (middle), and a 1DCGI interpolation of the test image.

Visual results produced by iNEDI and 1DCGI are comparable. FIG. 14 shows detail regions of a four-times reduced Lena test image and a two-times reduced Monarch test image (shown at top). iNEDI and 1DCGI interpolated images are shown at middle and bottom respectively. 1DCGI accomplished the largest improvement in MSE relative to iNEDI for the Lena example shown. The Monarch image was the only case in which the iNEDI algorithm quantitatively outperformed 1DCGI in terms of PSNR. Nevertheless, both pairs of interpolated results appear qualitatively similar. FIG. 15 shows a comparison of the four-times enlarged results for the noisy Lena image. Some over-smoothing or "cartooning" effects are visible in the iNEDI image.

Figure 13:
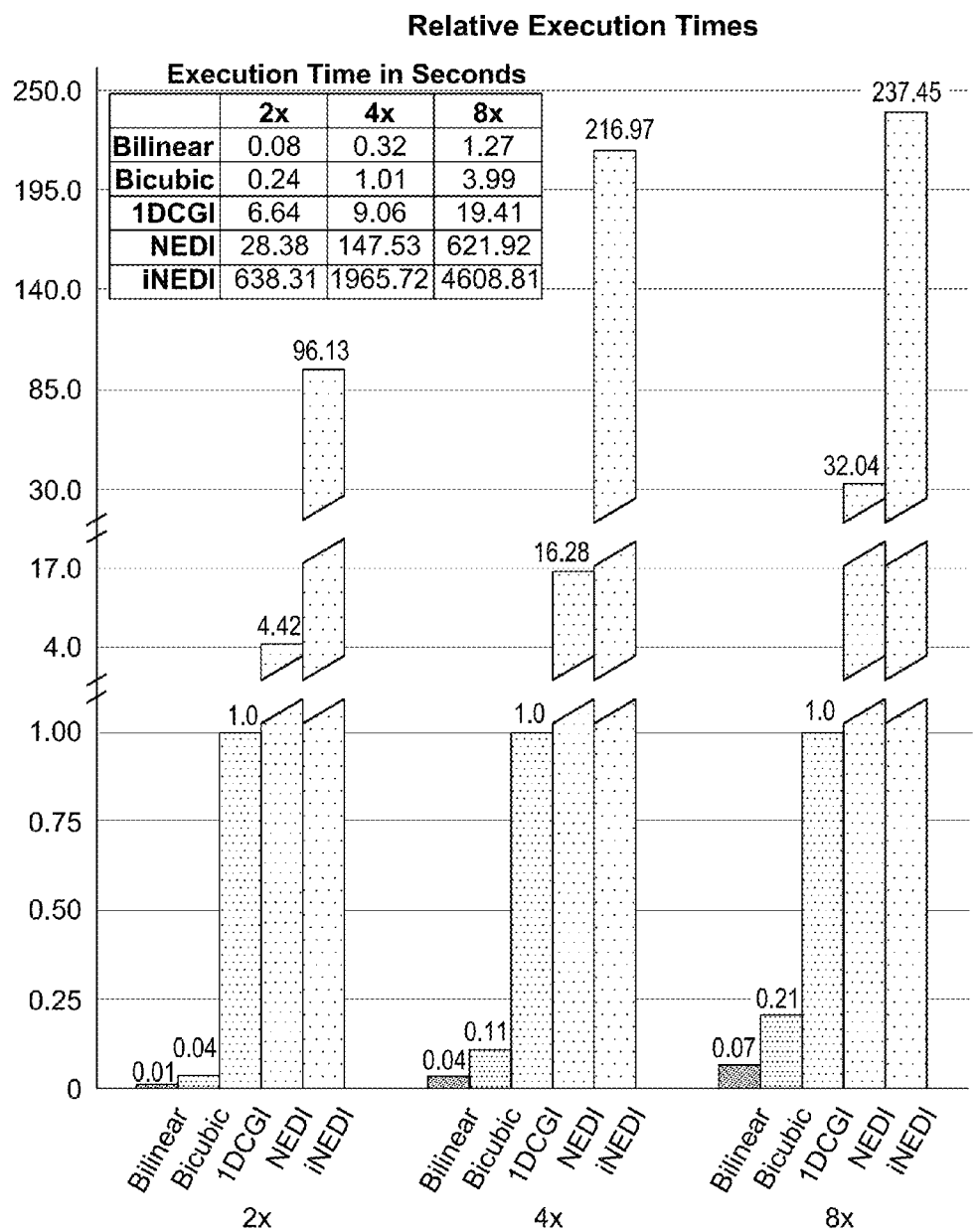
FIG. 13 shows a comparison of calculation times for resizing a 256×256 grayscale version of the Lena image to two-times, four-times, and eight-times original size using 1DCGI and other methods.

1DCGI accommodates arbitrary scaling factors and performs at much faster speeds than the other directional alternatives (NEDI and iNEDI). Additionally, unlike NEDI and iNEDI, larger scaling factors do not require repetition of the full 1DCGI method. Once displacements are calculated, resizing is accomplished with one-dimensional linear or cubic interpolation regardless of scaling factor. FIG. 13 shows the calculation times for resizing a 256×256 grayscale version of the Lena image to two-times, four-times, and eight-times original size. Times reported are the best of three trials executed in MATLAB version 7.10 on a 3.06 GHz Intel Core 2 Duo computer with four gigabytes of RAM. Although 1DCGI is well suited for parallelization, none of the execution times reported herein correspond to parallelized implementations. The execution time for iNEDI was nearly 100 times as long as 1DCGI for a two-times expansion and over 235 times as long for an eight-times expansion. The time required for bicubic expansion ranges from 4% to roughly 21% of that required by 1DCGI.

V. Conclusions

This disclosure demonstrates the Control Grid Interpolation of a single image as a one-dimensional problem. By treating interpolation along the column dimension separately from interpolation along the row dimension, the flow of pixel intensities is constrained to one degree of freedom. This separable formulation is well-configured to exploit the computational benefits of parallelization. Furthermore, the algorithm is robust to noise that fixed kernel-size algorithms are more sensitive to.

Overall image structure largely determines the added value of 1DCGI. Test images were chosen to include a range of natural image features. Images with large regions of uniformity may benefit less from the proposed technique (e.g. Peppers and Pens images in FIG. 12). For a two-times expansion of the Pens image, the predominantly smooth areas are interpolated better with the larger kernel size of the bicubic method. The more pixelated three-times and four-times under-sampled images benefit from 1DCGI, while the bicubic method begins to act on unrelated and cross-edge information, decreasing accuracy. The Monarch image creates difficulties for the proposed algorithm in that the dark lines on the wings frequently bifurcate. This creates a situation where multiple, non-parallel isophotes can pass through a given pixel. As a result, the Monarch test image is the one case where 1DCGI performs less impressively than iNEDI based on PSNR. However, visual inspection of a detail region from Monarch, as seen in FIG. 14, highlights that 1DCGI still manages to mitigate much of the stair-stepping seen in the down-sampled image. In general, the utility of the proposed method (as with all directional methods) is most apparent in image regions where curved and angled structures appear as stair-stepped after interpolation with scene-based methods.

Adjustment of parameters, such as the error tolerance or maximum allowable iterations, can force the system to be more or less stringent about enforcing the brightness constraint. Sufficiently high error tolerance (with respect to the brightness constraint) holds displacements close to initial conditions and leads to interpolation primarily along grid lines (zero displacements). Low error tolerance and excessive iterations can result in larger displacements and streaking artifacts. The streaking artifacts can be reduced by imposing limitations on displacement magnitudes. The results presented herein are for displacements that are restricted to lengths smaller than the expansion factor.

The use of an optical flow-based optimization framework in 1DCGI presents the opportunity to exploit alternative error metrics, in addition to the brightness constraint, that may be appropriate for specific applications. The framework may also include divergence constraints for fluid flow velocity images and extension to color images. The proposed framework may also be extended to several, higher dimension applications. In conjunction with multi-channel and higher dimension image sets, parallelization may be used to capitalizing on the separable nature of the framework.

Beyond an overall improvement in quantitative image quality, the proposed methods and systems accommodate arbitrary scaling factors, and require significantly less time than other directional methods with similar qualitative results. Furthermore, the region of the image considered for displacement calculations is relatively compact, making 1DCGI attractive for interpolation when only a portion of the image is available (such as during internet downloads or printing). The proposed implementation of 1DCGI is efficient, accurate, and produces visually appealing interpolation results.

Although the image processing systems and methods herein have been described with reference to specific embodiments, various changes may be made without departing from the spirit or scope of the present disclosure. Examples of such changes have been given in the foregoing description. Accordingly, the disclosure of examples and embodiments herein is intended to be illustrative of the scope of the invention and is not intended to be limiting. It is intended that the scope of this application shall be limited only to the extent required by the appended claims. The image processing systems and methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A method comprising:
    establishing a first magnified resolution lattice from an original resolution lattice of an original image;
    generating first new pixels in the first magnified resolution lattice via one dimensional interpolations between:
        original pixels imported into the first magnified resolution lattice from the original image; and
        first displacement locations established by first optical flow displacement vectors extending within the first magnified resolution lattice; and
    displaying an output image based on at least the first magnified resolution lattice;
    wherein:
        establishing the first magnified resolution lattice comprises:
            generating a first rowcol comprising first rowcol pixels imported from a first original rowcol of the original resolution lattice,
            generating a second rowcol comprising second rowcol pixels imported from a second original rowcol of the original resolution lattice; and
            generating a new rowcol between the first and second rowcols, the new rowcol configured to accommodate a first portion of the first new pixels;
        generating the first new pixels comprises:
            establishing a first displacement vector from a first node pixel in the first rowcol,
                the first node pixel comprising a first node pixel intensity,
                the first rowcol pixels comprising the first node pixel, and
                the first optical flow displacement vectors comprising the first displacement vector; and
            generating a first new pixel intensity for a first new pixel at the new rowcol based on the first displacement vector,
                the first portion of the first new pixels comprising the first new pixel;
    and
    "rowcol" refers to one of "column" or "row".

2. The method of claim 1, wherein:
    the first rowcol comprises:
        a first row comprising first row pixels from a first original row of the original resolution lattice, the first rowcol pixels comprising the first row pixels;
    the second rowcol comprises:
        a second row comprising second row pixels from a second original row of the original resolution lattice, the second rowcol pixels comprising the second row pixels; and
    the new rowcol comprises:
        a new row between the first and second rows in the magnified resolution lattice.

3. The method of claim 1, wherein:
    the first rowcol comprises:
        a first column comprising first column pixels from a first original column of the original resolution lattice, the first rowcol pixels comprising the first column pixels;
    the second rowcol comprises:
        a second column comprising second column pixels from a second original column of the original resolution lattice, the second rowcol pixels comprising the second column pixels; and
    the new rowcol comprises:
        a new column between the first and second columns in the magnified resolution lattice.

4. The method of claim 1, wherein:
    establishing the first displacement vector comprises:
        establishing a first displacement location in the second rowcol at an end of the first displacement vector; and
    generating the first new pixel intensity for the first new pixel comprises:
        interpolating to generate a first displacement intensity of the first displacement location;
        interpolating to generate a first intermediate intensity of a first intermediate location at the new rowcol based on the first displacement intensity and the first node pixel intensity; and
        interpolating to generate the first new pixel intensity for the first new pixel of the new rowcol based on the first intermediate intensity.

5. The method of claim 4, wherein:
    generating the first new pixels further comprises:
        establishing a second displacement vector from a second pixel in the first rowcol,
            the second pixel comprising a second pixel intensity,
            the first rowcol pixels comprising the second pixel, and
            the first optical flow displacement vectors comprising the second displacement vector;
        establishing a second displacement location in the second rowcol at an end of the second displacement vector;

interpolating to generate a second displacement intensity of the second displacement location;
interpolating to generate a second intermediate intensity of a second intermediate location at the new rowcol based on the second displacement intensity and the second pixel intensity; and
interpolating to generate a second new pixel intensity for a second new pixel of the new rowcol based on the second intermediate intensity.

6. The method of claim 5, wherein:
interpolating to generate the first new pixel intensity comprises:
interpolating to generate the first new pixel intensity based on the first and second intermediate intensities.

7. The method of claim 4, wherein:
interpolating to generate the first displacement intensity comprises:
interpolating with one-dimensional cubic Hermite interpolation based on one or more of the second rowcol pixels that neighbor the first displacement location.

8. The method of claim 4, wherein:
interpolating to generate the first intermediate intensity comprises:
interpolating with linear interpolation between the first displacement intensity and the first node pixel intensity.

9. The method of claim 4, wherein:
interpolating to generate the first new pixel intensity comprises:
interpolating with one-dimensional cubic Hermite interpolation based on one or more intermediate intensities generated for the new rowcol,
the one or more intermediate intensities neighboring the first new pixel and comprising the first intermediate intensity.

10. The method of claim 1, wherein:
establishing the first displacement vector comprises:
establishing a first displacement location in the second rowcol, the first displacement vector extending from the first node pixel to the first displacement location;
establishing the first displacement location comprises:
determining a nearest neighbor pixel for the first node pixel,
the nearest neighbor pixel being one of the second rowcol pixels at the second rowcol and, out of the second rowcol pixels, nearest to the first node pixel;
determining a first offset displacement to separate the nearest neighbor pixel from the first displacement location; and
establishing the first displacement location in the second rowcol, separated from the nearest neighbor pixel by the first offset displacement.

11. The method of claim 10, wherein:
determining the first offset displacement comprises:
establishing the first offset displacement such that the first displacement location substantially satisfies a one-dimensional optical flow brightness constraint relative to the first node pixel.

12. The method of claim 10, further comprising:
establishing a second displacement vector from a second pixel in the first rowcol using the first offset displacement determined for the first node pixel,
the first rowcol pixels comprising the second pixel,
the first optical flow displacement vectors comprising the second displacement vector.

13. The method of claim 1, wherein:
establishing the first magnified resolution lattice comprises:
establishing control node pixels for a control grid throughout the first magnified resolution lattice,
the original pixels in the first magnified resolution lattice comprising the control node pixels, including the first node pixel;
and
establishing node displacement vectors extending from the control node pixels,
the first optical flow displacement vectors comprising the node displacement vectors.

14. The method of claim 13, wherein:
establishing the control node pixels comprises:
fixedly spacing the control node pixels apart from each other.

15. The method of claim 13, wherein:
establishing the control node pixels comprises:
adaptively spacing the control node pixels apart from each other.

16. The method of claim 1, further comprising:
establishing a second magnified resolution lattice from the original resolution lattice, the second magnified resolution lattice being flipped relative to the first magnified resolution lattice;
generating second new pixels in the second magnified resolution lattice via one dimensional interpolations between:
original pixels imported into in the second magnified resolution lattice from the original image; and
second displacement locations established by second optical flow displacement vectors extending within the second magnified resolution lattice;
establishing a third magnified resolution lattice from the original resolution lattice, the third magnified resolution lattice being transposed relative to the first magnified resolution lattice;
generating third new pixels in the third magnified resolution lattice via one dimensional interpolations between:
original pixels imported into in the third magnified resolution lattice from the original image; and
third displacement locations established by third optical flow displacement vectors extending within the third magnified resolution lattice;
establishing a fourth magnified resolution lattice from the original resolution lattice, the fourth magnified resolution lattice being flipped and transposed relative to the first magnified resolution lattice; and
generating fourth new pixels in the fourth magnified resolution lattice via one dimensional interpolations between:
original pixels imported into in the fourth magnified resolution lattice from the original image; and
fourth displacement locations established by fourth optical flow displacement vectors extending within the fourth magnified resolution lattice.

17. The method of claim 16, further comprising:
flipping the second magnified resolution lattice after generating the second new pixels;
transposing the third magnified resolution lattice after generating the third new pixels; and
flipping and transposing the fourth magnified resolution lattice after generating the fourth new pixels.

18. The method of claim 17, wherein:
displaying the output image further comprises:
generating an output image based on the first, second, third and fourth magnified resolution lattices, the output image comprising:
original output pixels from the original image; and
new output pixels;
and
each of the new output pixels is generated from a weighted average calculation based on at least one of:
a corresponding pixel of the first new pixels of the first magnified resolution lattice;
a corresponding pixel of the second new pixels of the second magnified resolution lattice;
a corresponding pixel of the third new pixels of the third magnified resolution lattice; or
a corresponding pixel of the fourth new pixels of the fourth magnified resolution lattice.

19. The method of claim 16, wherein:
generating the first new pixels in the first magnified resolution lattice,
generating the second new pixels in the second magnified resolution lattice,
generating the third new pixels in the third magnified resolution lattice, and
generating the fourth new pixels in the fourth magnified resolution lattice occur simultaneously with each other.

20. The method of claim 1, wherein:
generating the first new pixels for the first magnified resolution lattice comprises:
generating the first new pixels of the first magnified resolution lattice based on the first displacement vector via a first one of:
a row-to-row-next (RRN) implementation wherein:
a second RRN row is located below a first RRN row; and
an RRN displacement vector extends downwards from the first RRN row to the second RRN row;
a row-to-row-previous (RRP) implementation wherein:
a second RRP row is located above a first RRP row; and
an RRP displacement vector extends upwards from the first RRP row to the second RRP row;
a column-to-column-next (CCN) implementation wherein:
a second CCN column is located right of a first CCN column; and
a CCN displacement vector extends rightwards from the first CCN column to the second CCN column;
or
a column-to-column-previous (CCP) implementation wherein:
a second CCP column is located left of a first CCP column; and
a CCP displacement vector extends leftwards from the first CCP column to the second CCP column.

21. The method of claim 20, wherein:
for the row-to-row-next implementation:
the first rowcol comprises the first RRN row;
the second rowcol comprises the second RRN row; and
the first displacement vector comprises the RRN displacement vector;
for the row-to-row-previous implementation:
the first rowcol comprises the first RRP row;
the second rowcol comprises the second RRP row; and
the first displacement vector comprises the RRP displacement vector;
for the column-to-column-next implementation:
the first rowcol comprises the first CCN column;
the second rowcol comprises the second CCN column; and
the first displacement vector comprises the CCN displacement vector; and
for the column-to-column-previous implementation:
the first rowcol comprises the first CCP column;
the second rowcol comprises the second CCP column; and
the first displacement vector comprises the CCP displacement vector.

22. The method of claim 20, wherein:
generating second new pixels for a second magnified resolution lattice of the original resolution lattice based on a second displacement vector between rowcols of the second magnified resolution lattice, comprising a second one of:
the row-to-row-next implementation;
the row-to-row-previous implementation;
the column-to-column-next implementation; or
the column-to-column-previous implementation;
generating third new pixels for a third magnified resolution lattice of the original resolution lattice based on a third displacement vector between rowcols of the third magnified resolution lattice, comprising a third one of:
the row-to-row-next implementation;
the row-to-row-previous implementation;
the column-to-column-next implementation; or
the column-to-column-previous implementation;
and
generating fourth new pixels for a fourth magnified resolution lattice of the original resolution lattice based on a fourth displacement vector between rowcols of the fourth magnified resolution lattice, comprising a fourth one of:
the row-to-row-next implementation;
the row-to-row-previous implementation;
the column-to-column-next implementation; or
the column-to-column-previous implementation.

23. The method of claim 22, wherein:
displaying the output image further comprises:
generating an output image based on the first, second, third and fourth magnified resolution lattices, the output image comprising:
original output pixels from the original image; and
new output pixels;
and
each of the new output pixels is generated from a weighted average calculation based on at least one of:
a corresponding pixel of the first new pixels of the first magnified resolution lattice;
a corresponding pixel of the second new pixels of the second magnified resolution lattice;
a corresponding pixel of the third new pixels of the third magnified resolution lattice; or
a corresponding pixel of the fourth new pixels of the fourth magnified resolution lattice.

24. The method of claim 1, wherein:
generating the first new pixels comprises:
generating the first new pixels via one or more processors executing an imaging application, the one or more processors having access to one or more memory modules comprising the original image and the imaging application; and storing the output image, derived from the first new pixels in the first magnified resolution lattice, in at least a portion of the one or more memory modules.

25. The method of claim 1, wherein:
generating the first new pixels comprises:
generating the first new pixels to represent one or more portions of a physical article when the original image depicts only a part of the physical article.

26. A system for generating an output image based on an original image via an imaging application executable by one or more processors, the original image and the imaging application being stored in one or more memory devices, the system comprising:
a parsing module configured to establish a magnified resolution lattice from an original resolution lattice of the original image;
an optical flow displacement module configured to:
establish optical displacement vectors extending, within the magnified resolution lattice, between original pixels and optical displacement locations, the optical displacement vectors based on one-dimensional optical flow brightness constraint calculations for the original pixels; and
a new pixel generation module configured to generate new pixels in the magnified resolution lattice via one or more interpolations based on the optical displacement vectors;

wherein:
the magnified resolution lattice comprises:
a first row comprising first original pixels of the original pixels, the first original pixels imported from a first original row of the original resolution lattice;
a second row comprising second original pixels of the original pixels, the second original pixels imported from a second original row of the original resolution lattice; and
an intermediate row between the first and second rows, the intermediate row configured to accommodate first new pixels of the new pixels;
the optical displacement vectors comprise a first displacement vector extending between a first pixel of the first original pixels and a first displacement location of the optical displacement locations, the first displacement location located in the second row; and
the new pixel generation module comprises:
a first interpolation module configured to interpolate an intensity of the first displacement location;
a second interpolation module configured to interpolate an intensity of a first intermediate location at the intermediate row, based on the intensity of the first displacement location and an intensity of the first pixel; and
a third interpolation module configured to generate a first new pixel of the intermediate row by interpolating an intensity of the first new pixel based on the intensity of the first intermediate location.

\* \* \* \* \*